(12) United States Patent
Anno et al.

(10) Patent No.: US 8,164,765 B2
(45) Date of Patent: Apr. 24, 2012

(54) INFORMATION PROCESSING APPARATUS, CONTROLLING METHOD, AND CONTROL PROGRAM FOR THE SAME

(75) Inventors: Makoto Anno, Minato-ku (JP); Hiroyuki Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1492 days.

(21) Appl. No.: 11/432,272

(22) Filed: May 11, 2006

(65) Prior Publication Data

US 2006/0279780 A1    Dec. 14, 2006

(30) Foreign Application Priority Data

Jun. 10, 2005   (JP) .................................. 2005-171663

(51) Int. Cl.
*G06F 3/12*     (2006.01)
*G06K 15/00*    (2006.01)

(52) U.S. Cl. ..................... 358/1.13; 358/1.15; 358/1.16; 358/1.18

(58) Field of Classification Search ................. 358/1.15, 358/1.13, 1.16, 1.17, 1.1, 1.18
See application file for complete search history.

(56) References Cited

U.S. PATENT DOCUMENTS
2004/0190057 A1 * 9/2004 Takahashi et al. ........... 358/1.15

FOREIGN PATENT DOCUMENTS
| JP | 04-096822 A | 3/1992 |
| JP | 11-065784 A | 3/1999 |
| JP | 2003-316560 A | 11/2003 |

* cited by examiner

*Primary Examiner* — Dov Popovici
(74) *Attorney, Agent, or Firm* — Canon USA Inc IP Division

(57) ABSTRACT

A program causes a computer to function as a specification unit configured to, with respect to data to be output that is stored in a predetermined output storage area, specify an order of outputting the data to be output, a state switching unit configured to switch the output storage area between an outputting state and a non-outputting state, and a sending unit configured to, in a case where the output storage area is in the outputting state, send a print job produced based on the data to be outputted stored in the output storage area to an image forming apparatus capable of processing the print job, in accordance with the order specified by the specification unit.

21 Claims, 23 Drawing Sheets

| No. | STATUS | CONTROL | JOB NAME | PRIORITY | NUMBER OF PAGES | NUMBER OF COPIES TO MAKE |
|---|---|---|---|---|---|---|
| 1 | P | ⊗ ⑪ ▷ | Job aaa | HIGH | 200 | 1000 |
| 2 | W | ⊗ ⑪ ▷ | Job B1 | MIDDLE | 20 | 2000 |
| 3 | W | ⊗ ⑪ ▷ | Job C124 | MIDDLE | 150 | 500 |
| 4 | W | ⊗ ⑪ ▷ | Job DDD | MIDDLE | 400 | 300 |
| 5 | W | ⊗ ⑪ ▷ | Job E333 | MIDDLE | 30 | 2500 |
| 6 | W | ⊗ ⑪ ▷ | Job FFF | MIDDLE | 100 | 600 |
| 7 | W | ⊗ ⑪ ▷ | Job G21 | MIDDLE | 200 | 300 |
| 8 | R | ⊗ ⑪ ▷ | Job H23 | MIDDLE | 70 | 200 |
| 9 | H | ⊗ ⑪ ▷ | Job I82 | LOW | 300 | 400 |
| 10 | H | ⊗ ⑪ ▷ | Job J77 | MIDDLE | 90 | 1000 |
| 11 | H | ⊗ ⑪ | | | | |
| 12 | H | | | | | |

Sidebar:
- TOP PAGE
- DEVICE
- JOB
  - ☐ PRINT JOB
  - ☐ PRINTED JOBS
  - ☐ COPYING JOB
  - ☐ SENDING JOB
  - ☐ RECEIVING JOB
- SUBMIT
- BOX
- ADDRESS
- USER MODE

P: PRINTING  W: STANDING BY  R: RIP  H: HELD
⊗ ERASE  ⑪ SUSPEND  ▷ RESUME

Web Browser — FILE EDIT VIEW FAVORITES TOOLS HELP
ADDRESS: http://192.168.100.11/job.htm

FIG.18
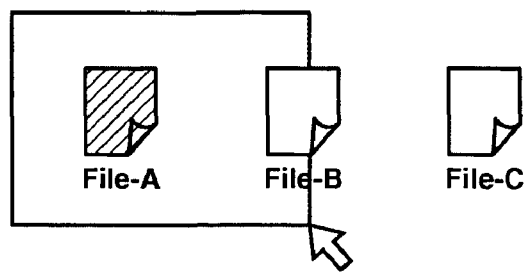
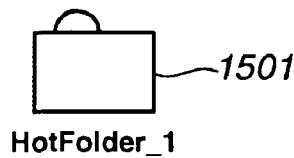
FIG.19
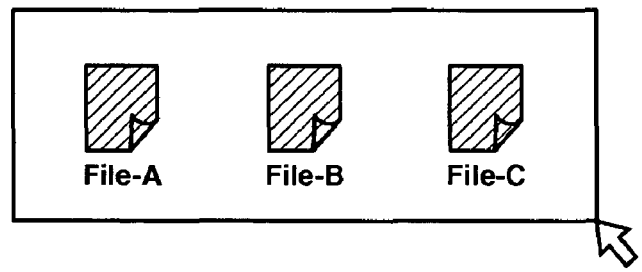
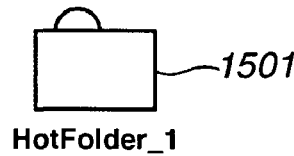
FIG.20
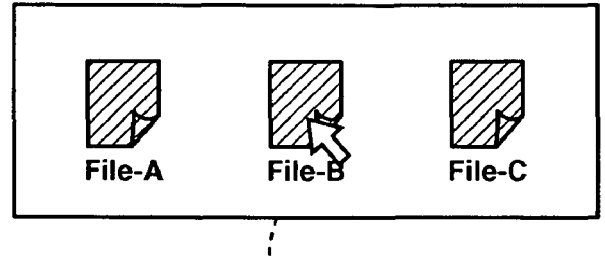
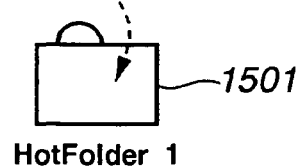

FIG.26

| | | |
|---|---|---|
| | FOLDER IDENTIFIER | 2620 |
| 2600 — SENDING ORDER INFORMATION | FLAG FOR PLURAL FILES AT THE SAME TIME | 2601 |
| | SENDING ORDER SPECIFICATION FLAG | 2602 |
| | FOLDER PERMISSION FLAG | 2603 |
| | FOLDER PRIORITY FLAG | 2604 |
| | OUTPUT FLAG | 2605 |
| | USER-SPECIFIED ORDER INFORMATION | 2606 |
| 2610 — ATTRIBUTE INFORMATION | PRINTING METHOD (ONE-SIDE/TWO-SIDE) | 2611 |
| | LAYOUT (N IN 1) | 2612 |
| | FINISHER SETTING INFORMATION — STAPLES | 2613 |
| | FOLDING | 2614 |
| | JOB TICKET ID | 2615 |
| | ⋮ | |

INFORMATION PROCESSING APPARATUS, CONTROLLING METHOD, AND CONTROL PROGRAM FOR THE SAME

BACKGROUND OF THE INVENTION

1. Field of the Invention

The present invention relates to a method for controlling image formation for printing document data with a format attached thereto, and also relates to a method and a program for printing a document. The data includes image data, text data, and graphic data produced by an application program and the like executed by a computer, for example.

2. Description of the Related Art

Typically, when printing out document data and the like sent from a client computer by using an image forming apparatus such as a printer or a multifunction peripheral (also referred to as "MFP"; a multifunction machine including a printer function, a scanner function, and the like), a printer driver installed in the client computer and the like are utilized. The printer driver performs a printing operation by sending, to the image forming apparatus, single page description language (PDL) data that can be interpreted and executed by the image processing apparatus, which is obtained by adding print setting information to one single document.

The print setting information, in addition to the settings for the print processing, sometimes includes settings for pre-processing and post-processing. For example, the settings for print processing including a paper size setting, a page layout setting, and a setting related to two-/one-sided printing and the settings for post-processing including a setting related to cutting of the paper, a setting related to folding, and a setting related to bookbinding can be described using job definition format (JDF) data. The JDF is defined by using an XML, and is a format in which parameters for the pre-processing, the print processing, and the post-processing can be described using previously defined tags.

In this case, a batch of the PDL data that corresponds to one single document is treated as one print job (sometimes referred to simply as a "job"). When a plurality of jobs (PDL data) is sent to the image forming apparatus, the image forming apparatus processes the plurality of jobs in the order of sending of the jobs and prints the jobs, one by one.

"POD" is an abbreviation for "print on demand", which refers to a print processing performed upon demand by a user. Under an environment of a print on demand (POD), there exist many workflows in which a plurality of different documents are printed out, in performing standardized and unified routine works, with specifying common print setting information (a "job ticket"). In other words, a job ticket is the print setting information in which the print settings are described.

A method based on such workflows is a direct print which is represented by a "hot folder". More specifically, the direct print is a method in which a job is put into the image forming apparatus directly from a client computer without utilizing a printer driver. The job in the direct print method is constituted by document data that is represented by portable document format (PDF) data and job definition format (JDF) data. Thus, JDF data is one form of the job ticket.

The hot folder is a folder provided with a command to which the job ticket can be previously related. The folder is a node that represents one layer in a hierarchical file management system, and other folders and files can be related therein. To put it differently, the folder can store other folders and files therein.

If it is necessary to perform the settings for a plurality of job tickets, a plurality of hot folders are previously produced and prepared, and the job ticket that is different from other job tickets is related to each of the hot folders. The plurality of hot folders are used in various manners depending on the purposes of each of the jobs. In addition, the document specified by a user is put into the hot folder by a drag-and-drop operation and by a file retrieval. The hot folder is monitored by a program that implements a hot folder, by polling at a previously determined time interval. It is recognized, by the polling, that the file is put into the hot folder. When the file is put into the hot folder, the file is attached with a previously defined job ticket and is then sent to the image forming apparatus as a job (that is, a combination of document data and job ticket data).

In regard to the aforementioned, a technology has been proposed such that the document that is put into the hot folder is not repeatedly printed for every polling operation (see Japanese Patent Application Laid-Open No. 2003-316560).

Further, there are some cases where an order of printing performed by the image forming apparatus differs from an order of sending of the jobs sent from the hot folder. This is caused in relation to sending of data through a network and also to print processing performed in the image forming apparatus.

In addition, a method in which the order of printing is made to be the same as the order of sending of data has been proposed. For example, there is a method in which an order corresponding to each of the plurality of document data is registered with order management data to specify an order of printing of documents (see Japanese Patent Application Laid-Open No. 04-096822).

Moreover, there is a method in which a printing attribute of the document data is provided with an order attribute, and thus, the order of printing of the documents is determined in accordance with the order attribute (see Japanese Patent Application Laid-Open No. 11-065784).

Furthermore, in recent years, digital cameras have been popular and are widely used. In this regard, image data photographed by the digital camera is compressed in a compression format of JPEG. In the JPEG format, singular photographic data is treated as one single JPEG file. In addition, in many cases, one photograph or a plurality of photographs taken by the digital camera is printed on one single paper sheet.

In this regard also, the hot folder can also be used for printing the photographs taken by the digital camera. The document data that is put into the hot folder (by an operation such as the drag-and-drop operation) is sent to a printer, as a print job every time the document data is put into the hot folder (or every time the document data is subjected to polling).

Accordingly, when a plurality of JPEG files is selected and simultaneously put into the hot folder all together (that is, when a plurality of files is selected and the selected plurality of files are simultaneously put into the hot folder by the drag-and-drop operation), the order of printing the JPEG files is not necessarily be the same as the order of sending of the JPEG files.

This difference in the order is caused due to three reasons discussed below:

(1) A periodical retrieval method such as polling is utilized for detecting that the job is put into the hot folder, and therefore, an order cannot be determined for a plurality of jobs that are put in the folder during an interval of the periodical retrievals;

(2) The polling is performed asynchronously in relation to a timing at which the user puts the job into the hot folder, and therefore, the jobs are not necessarily sent in accordance with the order in which the jobs are put into the hot folder, even when the files are put into the hot folder file by file; and (3) When a plurality of files are located in the hot folder, an order cannot be determined for the plurality of files. Therefore, an order of sending the files cannot be uniquely determined.

If an order of printing documents cannot be explicitly determined, the documents may sometimes be printed in accordance with specific implicit regulation (e.g., a rule or logic), depending on a procedure of a program that implements a hot folder. However, it is difficult for the user to know the implicit regulation, and still less in this case, the user cannot change the printing order to a desired order.

In addition, the method described in each of Japanese Patent Application Laid-Open No. 04-096822 and Japanese Patent Application Laid-Open No. 11-065784, is a method in which the printing order is previously specified before the printing is started. Therefore, it is difficult to apply the method to the hot folder with which the document data is sent to the image forming apparatus every time the document data is put into the hot folder. Moreover, in the method according to each of Japanese Patent Application Laid-Open No. 04-096822 and Japanese Patent Application Laid-Open No. 11-065784, it is necessary for the user to specify the printing order with respect to all the documents.

As a result of the aforementioned state of the art, when a plurality of document data are simultaneously (for example, during an interval between one polling and a next polling) put into the hot folder, the user cannot specify an order of outputting the plurality of document data.

Therefore, it would be beneficial and advantageous to provide a solution which will enable a user to specify an order of outputting a plurality of jobs that is put into a hot folder and of which also allows the jobs to be outputted in the specified order.

SUMMARY OF THE INVENTION

The present invention is directed to an image processing apparatus, a method of printing a document, and a program which enable a user to specify an order of outputting a plurality of jobs that is put into a hot folder, and further of which, also allows the jobs to be output in the specified order.

In addition, the present invention is directed to an image processing apparatus, a method of printing a document, and a program, which enables a user to specify an order of outputting by a simple method by specifying an attribute as a key, without specifying an outputting order for each document.

In at least one exemplary embodiment of the present invention, a program is provided which causes a computer to function as a specification unit configured to, with respect to data to be output that is stored in a predetermined output storage area, specify an order of outputting the data to be output, a state switching unit configured to switch the output storage area between an outputting state and a non-outputting state; and a sending unit configured to, in a case where the output storage area is in the outputting state, send a print job produced based on the data to be outputted stored in the output storage area to an image forming apparatus capable of processing the print job, in accordance with the order specified by the specification unit.

Furthermore, numerous other embodiments, features and aspects of the present invention will become apparent from the following detailed description with reference to the attached drawings.

BRIEF DESCRIPTION OF THE DRAWINGS

The accompanying drawings, which are incorporated in and constitute a part of the specification, illustrate numerous embodiments, features and aspects of the present invention and, together with the description, serve to explain the principles of the invention.

FIG. 13 is a schematic diagram showing an example of a tool for managing a job via a web browser of a client computer.

FIGS. 18-20 illustrate an exemplary method for putting a plurality of jobs into a hot folder.

FIG. 26 is a chart showing exemplary attribute information of a hot folder.

DETAILED DESCRIPTION OF THE EMBODIMENTS

Numerous exemplary embodiments, features and aspects of the present invention will now be herein described in detail in accordance with the accompanying drawings.

First Exemplary Embodiment

In a first exemplary embodiment of the present invention, a method is provided for sending jobs in a hot folder to an image forming apparatus by arranging the jobs in an order that a user desires. Among the several reasons as explained above in Background Section of this specification hereof, the reasons (1) and (2) can be solved by determining and defining a timing of sending in the hot folder.

In other words, with respect to an action of a sending function, the period and the timing of polling can be appropriately set by controlling a "Suspend Sending" and a "Resume Sending" at an arbitrary timing the user desires. More specifically, a plurality of jobs is put into the hot folder after the sending of jobs is temporarily suspended. Then, in a state where all the jobs to be sent are put into the hot folder, the suspension of sending is cancelled. Thus, a group of jobs can be simultaneously sent to the image forming apparatus.

Next, in order to overcome the reason (3) mentioned above, it is necessary to set a printing order within the hot folder and send jobs in accordance with the set order. For one example of an outputting order that is commonly and often used, there are ordering methods of ordering by a date, ordering by a name, or ordering by a job ID, and the like. In such an order, the documents in the hot folder are sent one by one to the image forming apparatus.

[Exemplary Digital Print System]

Figure 1:
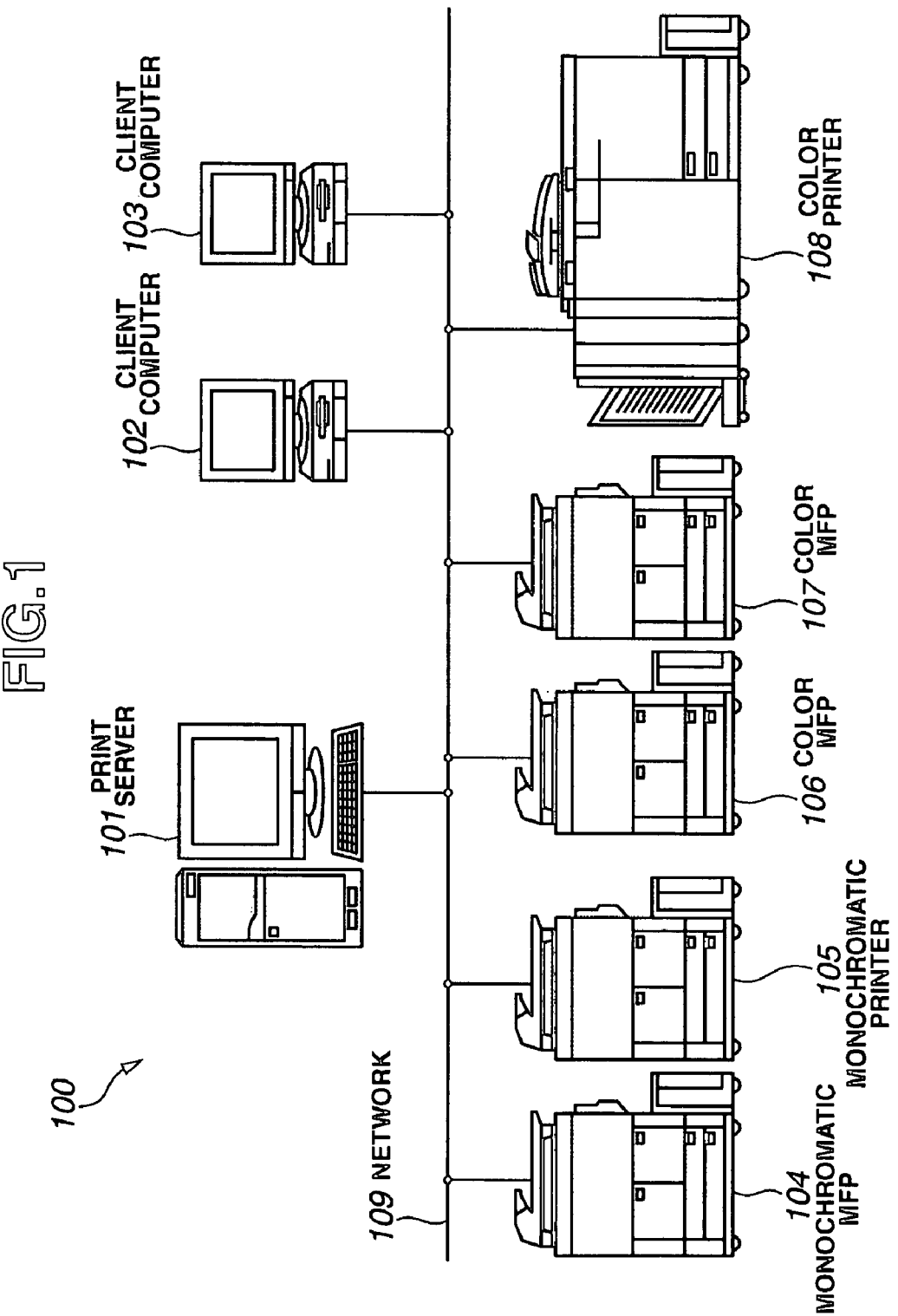
FIG. 1 is a diagram showing an example of a digital print system comprising various devices interconnected via a network.

FIG. 1 is a diagram showing an example of a digital print system 100 comprising various devices interconnected and in communication via a network. In the digital print system 100, there are provided one or more print servers 101, client computers 102-103, and image forming apparatuses (color and monochromatic MFPs and printers 104-108) that are connected to a network 109.

The print server 101 has several functions. Namely, first, the print server 101 sends and receives information to and from the client computers 102-103. Image information and setting information of a print job are first input to the print server 101. In addition, the print server 101 notifies the client computers 102-103 of information such as status information when the print job ends. Another function of the print server 101 is to manage and control the print job. For example, the print job that is received from the client computer 102-103 as shown in FIG. 1 is managed by the print server 101.

The print server 101 is capable of monitoring the status of all the image forming apparatuses (ref. numerals 104 through 108) that exist in the digital print system 100 and all the print jobs. In addition, the print server 101 can control the suspension and change in the settings of the print job, resume of the printing, or reproduction, moving, and erasure of the job. Further, the print server 101 is provided with a hot folder according to this embodiment, while a hot folder program that controls the hot folder is executed by the print server 101.

It is noted that the present invention can be applied to a print server 101 to which a printer is locally connected via a serial interface or a parallel interface, as in the case of the print server 101 as shown in FIG. 1.

It is noted that the hot folder and the hot folder program may be provided to the client computer 102-103. In this case, the document data that is put into the hot folder is not sent to the image forming apparatus; rather, it is sent to the print server. Then, the document data is sent to the image forming apparatus via the print server 101. In any case, the document data is finally sent to the image forming apparatus.

Client computers 102 and 103 are capable of executing an application program, and are capable of producing and editing data, issuing a print instruction, and the like. In addition, the user can put into the hot folder provided by the print server 101 the data and the like (hereinafter referred to as application data) produced by the application program, by using the function provided by a program (an operating system, for example) installed to the client computer 102-103. In order for this to occur, the user reproduces and moves into the hot folder provided by the print server 101 the application data that is the object of printing, for example, by the drag-and-drop operation and the like.

Further, the user can put a data file (print ready file) that can be input to the image forming apparatus as it is and printed, into the hot folder, by operating the client computer. Further still, the client computers 102 and 103 execute a client program (for example, a web browser) corresponding to a format of information provided by the print server 101. Thus, a state of devices and the print jobs managed by the print server 101 can be displayed. In this way, the client computer 102-103 assists monitoring and control of the print job and the devices.

In addition, an image forming apparatus that is provided with a various kinds of functions such as scanning, printing, and copying can be employed, instead of color printers 106 through 108 and monochromatic printers 104 and 105. In this case, the color printers 106 through 108 that are color MFPs and the monochromatic printers 104 and 105 that are monochromatic MFPs are mutually different in printing speed, costs for printing, and the like, and thus the color printers 106 through 108 and the monochromatic printers 104 and 105 can be properly used in accordance with an intended purpose of each printers.

[Exemplary Architecture of an MFP]

Figure 2:
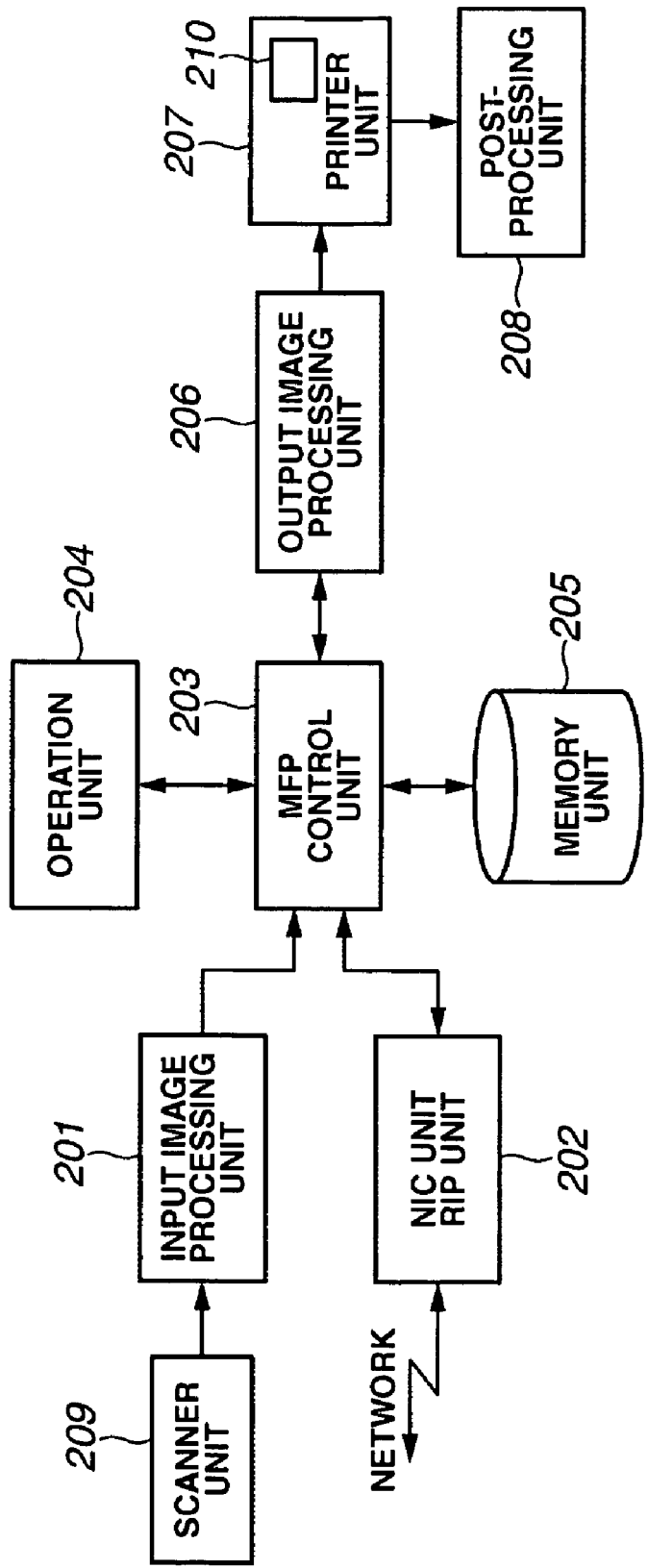
FIG. 2 is a block diagram showing an exemplary architecture of a multifunction peripheral (MFP).

An exemplary multifunction peripheral (MFP) is now herein explained below with reference to FIG. 2. In FIG. 2, an input image processing unit 201 reads a paper original or the like by an image reading apparatus such as a scanner unit 209 and performs image processing to image data that is read by the image reading apparatus.

A network interface card (NIC) unit/raster image processor (RIP) unit 202 is provided, wherein the NIC unit transfers the image data (principally, PDL data) that is input by utilizing a network to the RIP unit. Also, the NIC unit sends the image data within the MFP and apparatus information to an outside of the apparatus via the network. The RIP unit decrypts input page description language (PDL) data and performs a raster image process (RIP) (i.e., produces bitmap data (hereinafter simply referred to as image data) in a raster format) of the decrypted PDL data.

In some cases, the RIP unit is provided with a function for converting the application data into PDL format or into a format other than the PDL format that can be processed by the RIP unit (for example, PDF). In this case, a PDL is produced in accordance with print setting information described in the job ticket that is received together with the data. The PDL is processed in a manner such that the PDL is transferred to the RIP unit and converted into the image data, just as in the case of the PDL that is received from outside of the apparatus. If the inputted data is the image data, the raster processing by the RIP unit is not necessary.

Then, the image data processed by the RIP unit or input to the RIP unit is sent to an MFP control unit 203. The MFP control unit 203 controls traffic of the data that is input and output. In addition, the image data that is input to the MFP control unit 203 is temporarily stored in a memory unit 205. The stored image data is recalled when necessary.

An output image processing unit 206 performs an image processing for printing to the image data and sends the processed image data to a printer unit 207. The image processing includes processing such as quantization (binarization) and pseudo-gradation processing, for example.

The printer unit 207 feeds paper sheets, and the image data processed by the output image processing unit 206 is serially formed onto the paper sheets. The images may be formed, for instance, by an electrophotographic system, ink jet system, thermal transfer system, or the like. The printer unit 207 is further provided with a printer control unit 210 that controls an operation of the printer unit 207. The sheets onto which the image is formed are then transferred to a post-processing unit 208. The post-processing unit 208 performs sorting processing and finishing processing of the sheets.

An operation unit 204 allows the user to select a function from among various kinds of functions and instruct an operation. If a display apparatus of the operation unit 204 is a high-resolution apparatus, the operation unit 204 can be used in a manner such that the image data stored in the memory unit 205 is previewed. The user is prompted to confirm the previewed image data and to print the confirmed image data when the user issues an "OK" instruction.

Thus, the MFP is provided with various kinds of functions and can be used in various ways. An example of a flow of the image data is described below:
- (A) Copying Function: the input image processing unit 201→the output image processing unit 206→the printer unit 207;
- (B) Network Scanning: the input image processing unit 201→the NIC unit;
- (C) Network Printing: the NIC unit→the RIP unit→the output image processing unit 206→the printer unit 207;
- (D) Box Scan Function: the input image processing unit 201→the output image processing unit 206→the memory unit 205;
- (E) Box Print Function: the memory unit 205→the printer unit 207;
- (F) Box Receiving Function: the NIC unit→the RIP unit→the output image processing unit 206→the memory unit 205;
- (G) Box Transmission Function: the memory unit 205→the NIC unit; and
- (H) Preview Function: the memory unit 205→the operation unit 204.

It is noted that in the flow as described above, the MFP control unit 203 is omitted, although the MFP control unit 203 functions to determine a course of the flow. In addition, blocks that are included in the flow but in which no processing is performed are also omitted in the flow. For example, when the processing goes through the processing by the output image processing unit 206, if there is no image processing performed by the output image processing unit 206, the processing is omitted. Further, if the document data is sent from the print server 101 to the image forming apparatus by the hot folder function, the flow is the data flow shown in the item (C) mentioned above.

[Exemplary Operation Unit]

Figure 3:
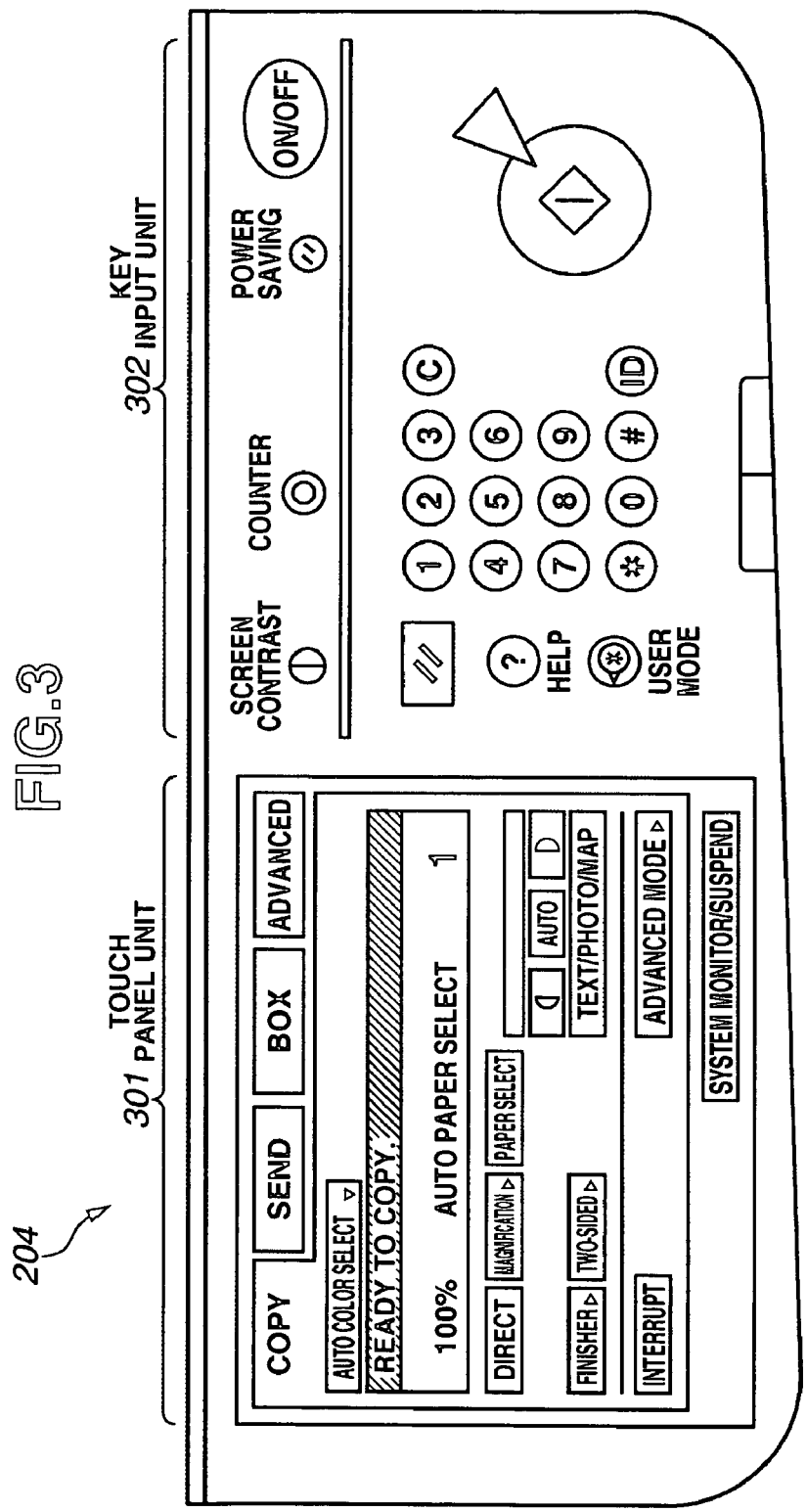
FIG. 3 is a schematic diagram showing an example of an operation unit.
Figure 4:
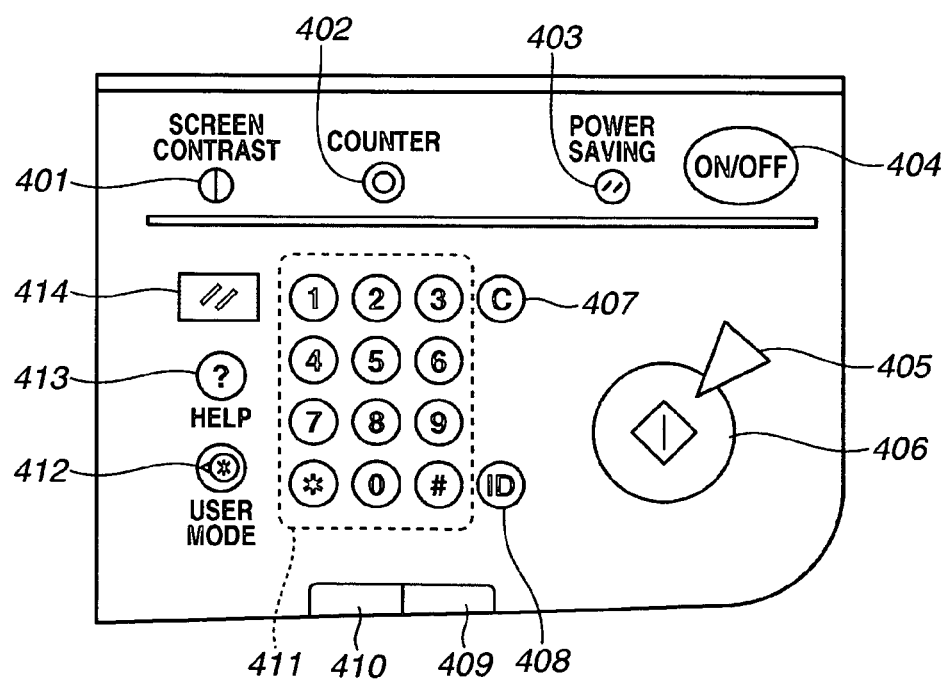
FIG. 4 is a schematic diagram showing an example of a key input unit from the operation unit.

Next, the operation unit 204 is explained with reference to FIG. 3. The operation unit 204 is constituted by a key input unit 302 and a touch panel unit 301. FIG. 4 and respectively show a detailed explanation of the key input unit 302 and the touch panel unit 301. Hereinbelow, each of the key input unit 302 and the touch panel unit 301 are explained in detail.

FIG. 4 shows the key input unit 302 that is capable of performing stationary operation settings. An operation unit power switch 404 is a switch that switches between a standby mode (a normal operation state) and a sleep mode. The operation unit power switch 404 can be operated when a main power switch (not shown) that supplies power to the whole system is on.

The sleep mode is a state where the MFP suspends the program in a state of waiting for interruption in preparation for a network printing or facsimile transmission so that power consumption can be lowered. A power saving key 403 is a key that is operated in order to save power consumption by lowering a control temperature of a fixing device at the time of a standby mode. The control temperature can be lowered by adjusting settings for power saving ratio. When the operation mode is set to the power saving mode, it takes a specific period of time until the apparatus comes to a state in which printing can be performed.

A start key 406 is a key for instructing a start of copying, sending, or the like. A stop key 405 is a key for suspending the instruction made through the start key 406. Numeric keypads 411 are keys for entering numeric values for a various kinds of settings. A clear key 407 is a key for clearing the set numeric values. An ID key 408 is a key for inputting a personal identification number previously set in order to authenticate an operator of the MFP. A reset key 414 is a key for invalidating various kinds of settings and turning the setting back to a default state. A help key 413 is a key for displaying a guidance and help information. A user mode key 412 is a key for shifting to a system setting screen per user.

Still referring to FIG. 4, a counter confirm key 402 is a key for allowing the operation unit 204 or the like to display a number of output copies that is stored in a soft counter that counts a number of printed copies provided within the MFP. The counter confirm key 402 is operable to display the number of outputted copies depending on an operation mode such as copy, print, scan, and facsimile, a color mode such as color and monochromatic, a paper size such as large and small, or the like.

An image contrast dial 401 is a dial for adjusting visibility of a screen by controlling a light intensity of a back light of a liquid crystal display of the touch panel unit 301. An execute/memory light 410 is a light for notifying that an operation is being executed, with flashing while the print job is being executed or an access is attempted to the memory. An error indicator 409 is a light for notification with flashing in a case where the job cannot be executed, in the case of an error requiring a service person call, or in the case of an operator call for notifying jamming, exhaustion of consumables, or the like.

Figure 5:
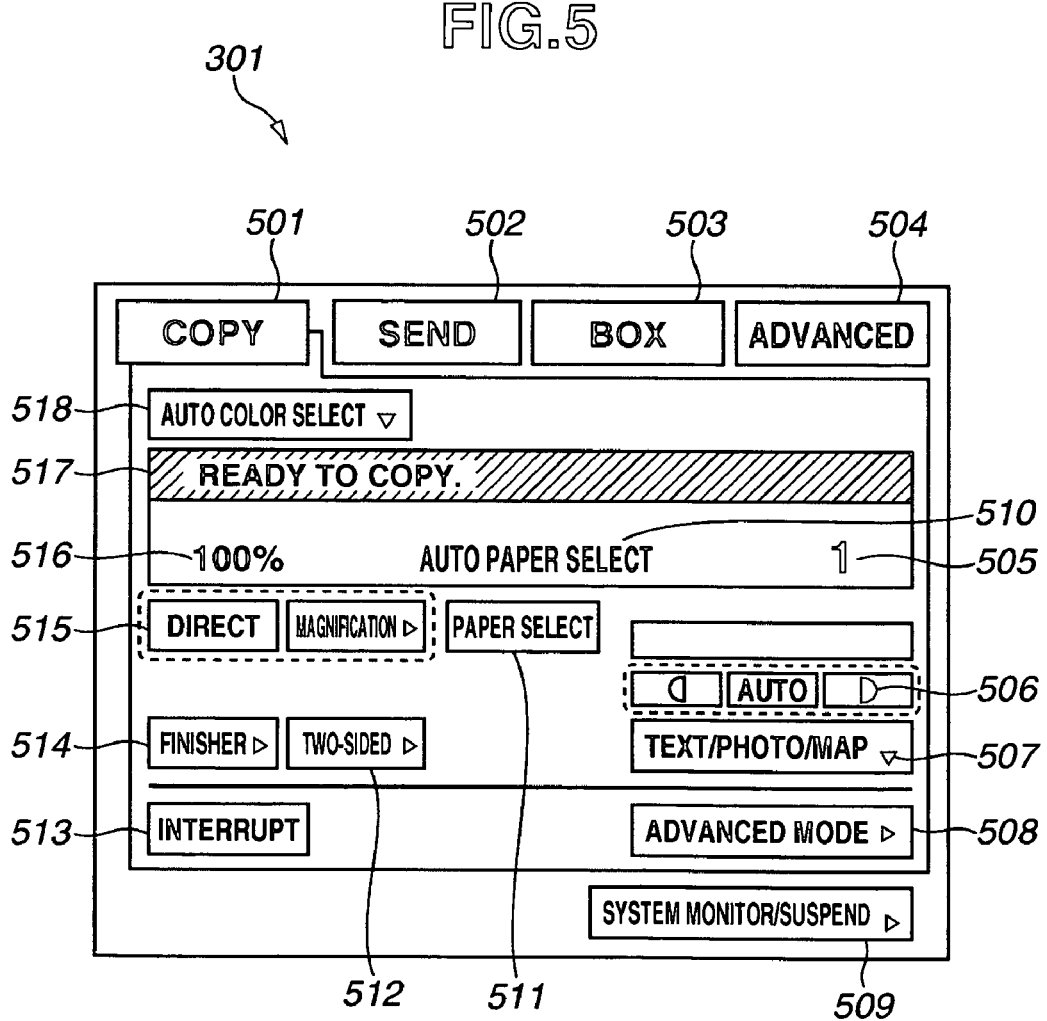
FIG. 5 is a schematic diagram showing an example of a touch panel unit from the operation unit.

FIG. 5 is a schematic diagram of an exemplary touch panel unit 301 showing a touch panel display constituted by a liquid crystal display (LCD) and a transparent electrode attached on the LCD. FIG. 5 shows an initial screen at the time of the standby mode. In this regard, various kinds of operation screens can be displayed in accordance with the setting operation. The user can shift from one operation mode of the MFP to each of the operation modes by selecting each tab.

A copy tab 501 is a tab key for shifting to an operation screen for a copying operation. A send tab 502 is a tab key for shifting to an operation screen for instructing a transmission (sending) operation for sending a facsimile and an electronic mail, and the like. A box tab 503 is a tab key for shifting to a screen for inputting and outputting the job into a box (a storage unit that stores the jobs per user). An option tab 504 is a tab key for setting an advanced function such as scanner settings. A system monitor/suspend key 509 is a key for displaying a state or a status of the MFP.

A color selection setting key 518 is a key for previously selecting between a color copying mode, a monochromatic copying mode, and an automatic selection mode. A magnification ratio setting key 515 is a key for shifting to a screen through which settings for ratio of magnification such as direct magnification, enlargement, and reduction are performed. A post-processing setting key 514 is a key for shifting to a screen through which presence or absence, a number, and a position of staples and punching holes are set.

Still referring to FIG. 5, a two-sided printing setting key 512 is a key for shifting to a screen through which a selection is made between one-sided printing and two-sided printing. A paper size setting key 511 is a key for shifting to a screen through which a selection is made as to a paper feed stage, paper size, and a type of medium. An image mode setting key 507 is a key for selecting an image mode suitable to an original image such as a text mode or a photograph mode. A density setting key 506 is a key for adjusting a density of the color of an output image. A status display unit 517 is a display unit for displaying a simple state such as a standby state, warming up state, a jammed state, and an occurrence of an error. A magnification display unit 516 is a unit for displaying the magnification set by the magnification setting key 515. A paper size display unit 510 is a unit for displaying the paper size and a paper mode that are set by the paper size setting key 511.

Furthermore, a copy number display unit 505 is a unit for displaying a number of copies to be printed that is specified by the numeric keypads 411 and what the number of the page currently being printed is during operation. Additionally, an interruption key 513 is a key that is utilized in interrupting another job during a copying operation. An advanced mode key 508 is a key for shifting to a screen through which various kinds of image processing and a setting for a layout including settings for series copies, settings for cover/slip sheets, a reduction layout, and an image moving.

[Exemplary Printer Unit]

Figure 6:
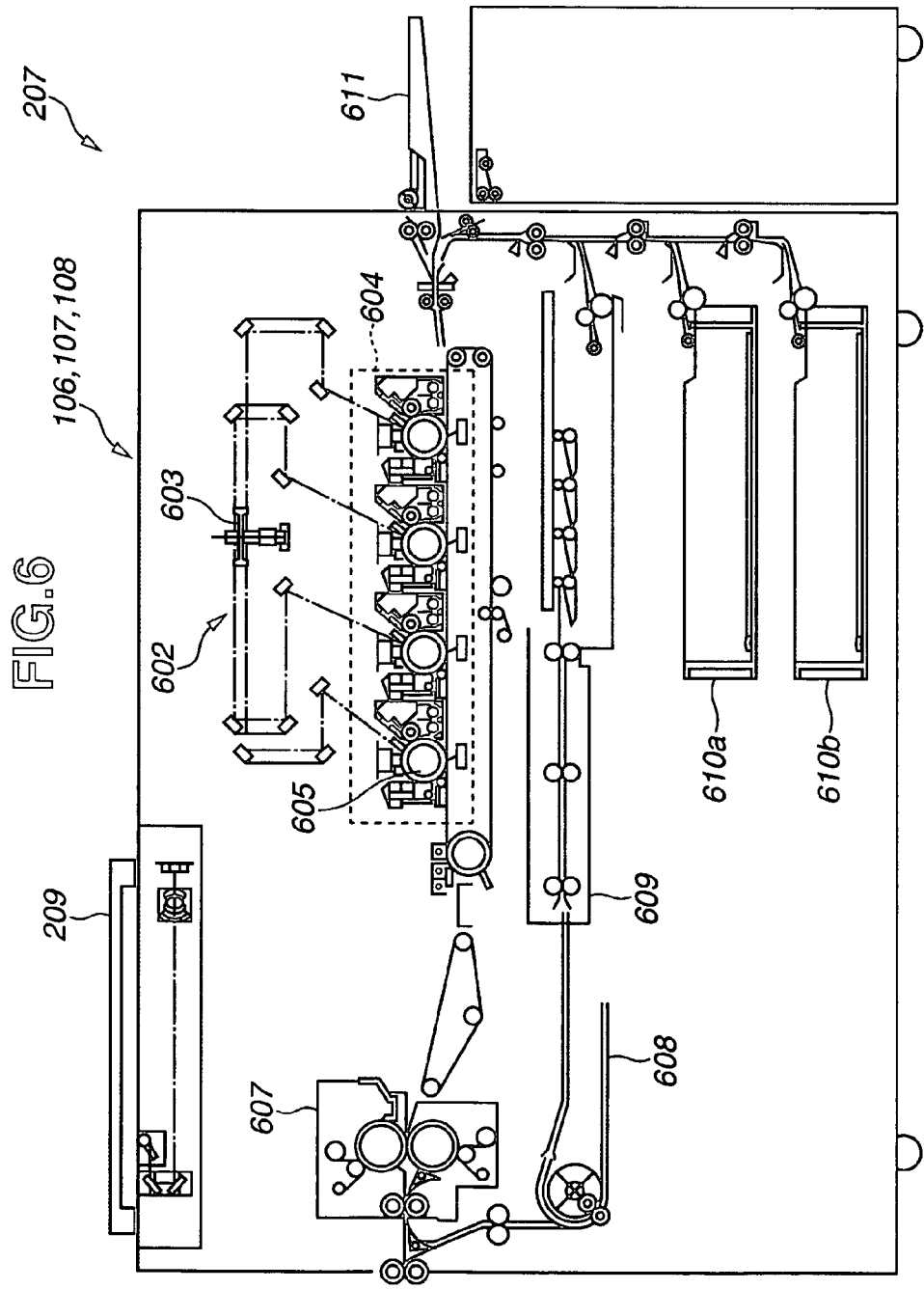
FIG. 6 is a cross section showing an exemplary structure of a four-drum color system printer unit.

Next, an explanation is made as to a constitution of 4D (four-drum) color system MFPs 106 through 108, with reference to FIG. 6, which is a cross section of the printer unit 207 and the scanner unit 209 shown in FIG. 2.

In the input image processing unit, the 4D color system MFP includes the scanner unit 209. Further, the MFP includes a laser exposure unit 602 that includes a polygonal mirror 603 and an image production unit 604 that includes a photosensitive drum 605. Further, the MFP includes a fixing unit 607, paper feed/conveyance unit 608, and a printer control unit that controls the fixing unit 607 and the paper feed/conveyance unit 608 (although the printer control unit is not shown in FIG. 6, the printer control unit is equivalent to a block 210 in FIG. 2). In addition, the MFP is provided with a sheet storage vessels 610a and 610b, a manual paper feed port 611, and the like.

The scanner unit 209 optically reads an original image by illuminating an original that is placed on an original stand, converts the read image into an electric signal by a photoelectric conversion element to produce image data. The produced image data is input to the printer control unit 210 (not shown in FIG. 6), and is subjected to processing there, and then is sent to the printer unit 207 (equivalent to portions shown in FIG. 6 except for the scanner unit 209).

The laser exposure unit 602 makes a light ray such as a laser beam modulated in accordance with the image data incident on a rotational polygonal mirror that rotates at a constant angular velocity, and then irradiates the photosensitive drum 605 with the incident light as a reflection scanning light beam.

The image production unit 604 is provided with four series of electrophotographic process developing units (developing stations), and thus implements a full color printing. The four series of development units arranged in the order of cyan (C), magenta (M), yellow (Y), and black (K), after a predetermined time period lapses for each of the colors of magenta, yellow, and black after a start of image production by a cyan development station, serially execute image production operations for each color of magenta, yellow, and black.

By utilizing timing control techniques, a full color toner image is transferred onto the sheet without a color drift. More specifically, the image production unit 604 rotationally drives the photosensitive drum 605, allows the photosensitive drum 605 to be charged with electricity by the charging device, and then develops a latent image formed onto the photosensitive drum 605 by the laser exposure unit 602, by using a toner. Further, the image production unit 604 transfers the toner image onto the sheet, and collects fine particles of the toner remaining on the surface of the photosensitive drum 605 without being used for the transfer.

The fixing unit 607 is configured by combinations of rollers and belts. The fixing unit 607 is installed with a heat source such as a halogen heater. The fixing unit 604 dissolves and fixes the toner on the sheet onto which the toner image is transferred by the image production unit 604, by applying heat and pressure thereto.

The paper feed/conveyance unit 608 is provided with one or more sheet storage vessels represented by a sheet cassette and a paper deck (in FIG. 6, the sheet storage vessels are equivalent to the sheet storage vessels 610a and 610b). The paper feed/conveyance unit 608 separates one single sheet from a plurality of sheets stored in the sheet storage vessel 610a or the sheet storage vessel 610b, in accordance with the control by the printer control unit 210, and conveys the separated sheet to the image production unit 604 and the fixing unit 607. The sheet is conveyed, then the toner image for each color is transferred onto the sheet, and finally, a full color toner image is formed onto the sheet. In addition, in a case where the images are formed on both sides of the sheet, the printer control unit 210 controls the paper feed/conveyance unit 608 so that the sheet that has passed the fixing unit 607 again passes a conveyance] path for conveying the sheet to the image production unit 604.

The printer control unit 210 communicates with the MFP control unit 203 that controls the MFP, and performs the control in accordance with the instruction from the MFP control unit 203. In addition, the printer control unit 210 issues and performs instructions so that a whole system can be operated without interruption in a balanced manner, while managing the state of each units of the scanner unit 209, the laser exposure unit 602, the image production unit 604, the fixing unit 607, and the paper feed/conveyance unit 608 mentioned above.

Next, the printer control unit 210 is discussed. In this regard, first, the explanation is made as to an outline of an operation of each portion of the printer control unit 210 during a time period from a state where the power is off and to a state where the operation can be performed.

When the power is turned on, the printer control unit 210 starts a preparation operation of the scanner unit 209 and the laser exposure unit 602. Further, the printer control unit 210 starts the preparation operation of the image production unit 604, the fixing unit 607, and the paper feed/conveyance unit 608. Then, the printer control unit 210 waits for a communication with the MFP control unit 203 that controls over the MFP to start.

When the communication between the printer control unit 210 and the MFP control unit 203 is established, specifications of the devices of the printer control unit 210 and the MFP control unit 203 are sent and received between the printer control unit 210 and the MFP control unit 203. After that, when the preparation operation of each unit ends and when an image forming operation can be performed, the printer control unit 210 notifies the MFP control unit 203 that the operation of each unit can be performed. That is to say, the printer control unit 210 notifies the MFP control unit 203 of device status of each unit.

One of the notifications by the printer control unit 210 to the MFP control unit 203 is described below. First, the paper feed/conveyance unit 608 detects a size of the sheet stored in the sheet storage vessel, a remaining amount (storage amount) of the sheets stored in the sheet storage vessel, and a state of operation of a driving unit such as a motor (that is, whether the unit can be operated or is out of order), and then notifies the MFP control unit 203 of a result of detection. Next, the image production unit 604 notifies the MFP control unit 203 of an amount of toner stored in a toner storage vessel.

Next, an explanation is made as to an outline of an operation of each unit of the printer control unit 210 during a period of time, under a state where each unit can be operated, from a time when the operation instruction is notified from the MFP control unit 203 to a time when a series of print operations are executed and ended.

First, the MFP control unit 203 notifies the printer control unit 210 of an operation start command. Upon receiving the operation start command, the printer control unit 210 issues an instruction for starting printing operation to each of the laser exposure unit 602, the image production unit 604, the paper feed/conveyance unit 608, and the fixing unit 607.

At this time, the laser exposure unit 602 starts a rotation of the motor that drives the polygonal mirror 603 (polygon motor). The image production unit 604 rotationally drives the photosensitive drum 605 and charges the photosensitive drum 605 with electricity. The fixing unit 607 turns a fixing heater on and raises a temperature of the fixing heater to such a level that the toner on the sheet can be fixed onto the sheet. The paper feed/conveyance unit 608 sets a driving unit (motor) to be in a state where the driving unit is ready to convey the sheet.

When the operation of each portion of the apparatus is ready to be performed, the printer control unit 210 notifies the MFP control unit 203 of a completion of the preparation for operation. The MFP control unit 203, upon receiving the notification of the completion of preparation from the printer control unit 210, instructs a printing operation to be performed page by page. The MFP control unit 203, in the case of a print job of ten pages and twenty copies, for example, issues a print operation instruction for two hundred pages in total.

The printer control unit 210, upon receipt of the print operation instruction, issues a paper feed instruction to the paper feed/conveyance unit 608. The paper feed/conveyance unit 608, when the sheet can be fed, feeds and conveys one sheet of paper, and at the time the sheet reaches a predetermined position, notifies the printer control unit 210 that the sheet has reached the predetermined position. If the sheet cannot be fed, that is, in such a case where there is no sheet stored in the paper sheet storage vessel, for example, the paper feed/conveyance unit 608 notifies the printer control unit 210 that the sheet cannot be fed.

In addition, in order to detect that the sheets are being conveyed in a state where the sheets are multi-fed on the conveyance path (in a double-feed state), the paper feed/conveyance unit 608 is sometimes provided with a double-feed (the double-feed means a state where two or more sheets are conveyed with being mutually lapped over) detection sensor, a sheet thickness detection sensor that detects a thickness of the sheet, and the like.

When the sensor detects an abnormality or a failure, the paper feed/conveyance unit 608 discontinues a paper feeding operation and a paper conveyance operation, and then notifies the printer control unit 210 of the abnormality. In this case, the printer control unit 210 notifies the MFP control unit 203 of the cause of the suspension of the operation, the position of the sheets remaining in the apparatus, and the like.

In the case where the sheet is correctly conveyed without hindrance and reaches the predetermined position, the printer control unit 210 issues an instruction for starting an image production operation to the image production unit 604, in accordance with the notification from the paper feed/conveyance unit 608 to the effect that the sheet has reached the predetermined position. By this timing control, the toner image is transferred onto the sheet.

The fixing unit 607 monitors the temperature of the fixing unit 607 so as to control the temperature to be an appropriate fixing temperature. In this regard, however, if an amount of heat that the sheet draws from the fixing unit 607 is very large, the temperature of the fixing unit 607 sometimes drops. In this case, the fixing unit 607 notifies the printer control unit 210 of the drop of the temperature of the fixing unit 607. Then, upon the notification of the temperature drop in the fixing unit 607, the printer control unit 210 leaves a proper interval between each conveyance of the sheet so that the temperature of the fixing unit 607 does not further drop. In this case, if the temperature of the fixing unit 607 cannot be restored to a proper level, the printer control unit 210 temporarily suspends the operation, and then performs a control to resume the operation after the temperature is restored.

The printer control unit 210, after all the sheets are discharged, issues an instruction for stopping the operation to each unit, and receives a notification of the stop of operation from each unit, and then notifies the MFP control unit 203 of the end of the operation.

[Exemplary Post-Processing Unit]

Figure 7:
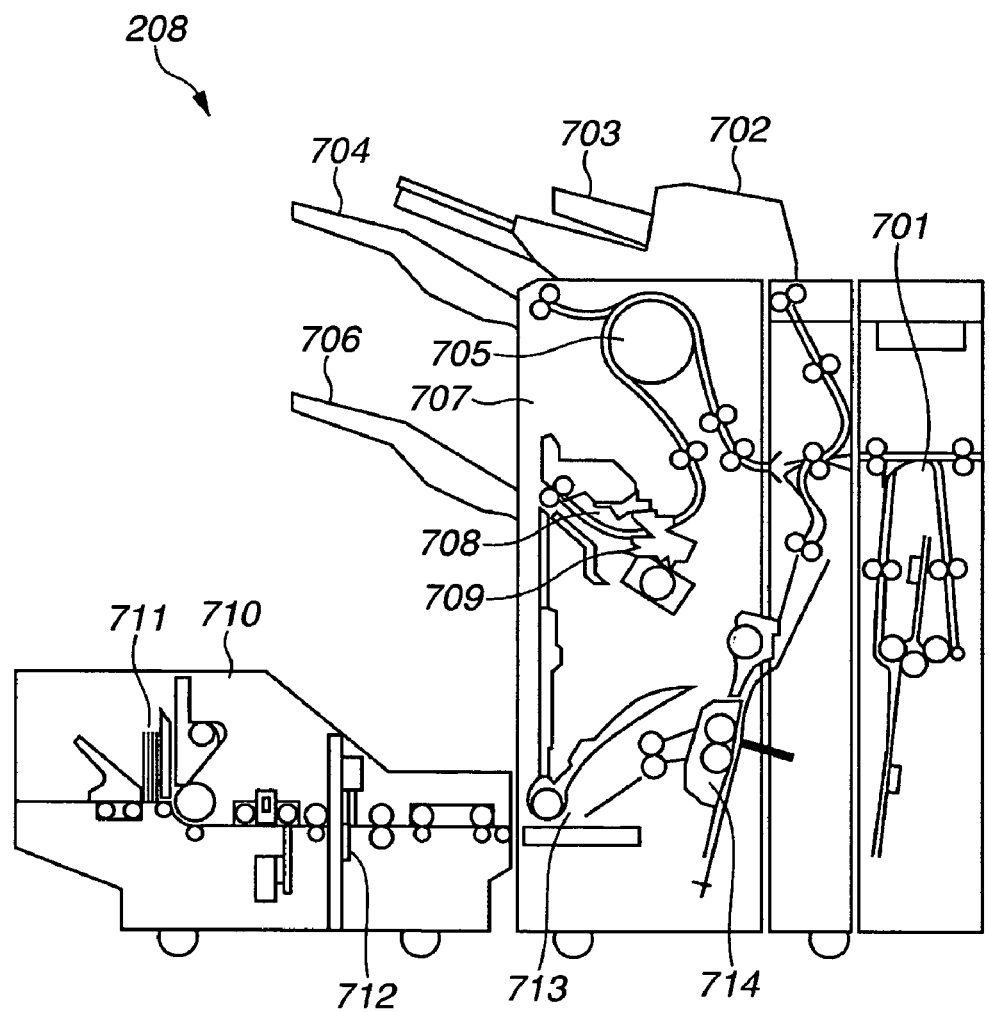
FIG. 7 is a cross section showing an exemplary structure of an inline finisher unit.

FIG. 7 is a cross section of an inline finisher that is an example of the post-processing unit 208. The sheet discharged from the fixing unit 607 of the printer unit 207 enters the inline finisher when the inline finisher is connected to the printer unit 207. The inline finisher is provided with a sample tray and a stack tray. The sheet is discharged onto either the sample tray or the stack tray by switching between the trays in accordance with the kind of the job and a number of sheets to be discharged.

There are two types of system for sorting the paper sheet. That is, the sorting of the paper sheet can be carried out by the sorting by a bin sort system in which a plurality of bins are provided and the paper sheet is sorted out to each of the bins; and by a shift sort system in which the bin (or the tray) is shifted, by using an electronic sort function, to the back or the front, and the output paper sheets are sorted out job by job.

The electronic sort function is called a collate. If the MFP is provided with a large capacity memory as the memory unit 205, a collate function that changes a page order of the image data per page stored in the larger capacity memory and a discharge order of the sheets can be implemented. The electronic sort function can be supported by using the collate function. A grouping function is a function for sorting the sheets page by page, while the sorting function is the function for sorting job by job.

Further, if a staple mode is set to the job to be output, the sheets are controlled to be discharged onto a stack tray 706. Further, the sheets are serially stored onto a processing tray 708 in the inline finisher job by job before the sheets are discharged onto the stack tray 706, and then the sheets are subjected to binding by a stapler 709 on the processing tray 708. After that, a bundle of recording paper sheets are discharged onto the stack tray 706.

In addition, before the paper sheet reaches the two trays mentioned above, there are provided a Z-folding device 701 for folding the paper sheet in the shape of Z and a puncher 705 that punches two (or three) holes used for filing on the paper sheet. The Z-folding device 701 and the puncher 705 respectively perform the processing of each of them in accordance with the type of the job. For example, if a Z-folding processing setting is performed by the user via the operation unit 204 for the setting related to a sheet processing for the job to be output, a folding process is performed to the recording paper sheet of the job, by the Z-folding device 701. After that, the sheets are controlled to pass an inside of the apparatus and also controlled to be discharged onto discharge trays such as the stack tray 706 and the sample tray 704.

Further, for example, if the user performs a punching processing setting via the operation unit 204 for the setting related to the sheet processing for the job to be output, the punching processing is performed to the recording paper sheets of the job, by the puncher 705. After that, the sheets are controlled to pass an inside of the apparatus and also controlled to be discharged onto discharge trays such as the stack tray 706 and the sample tray 704.

In addition, a saddle stitcher 714 performs the processing such that after a center part of the paper sheet is subjected to binding at two points, the paper sheet is half-folded by engaging the center part of the paper sheet to a roller to produce a booklet like a brochure. The sheets that are book-bound by the saddle stitcher 714 are discharged onto a booklet tray 713. In this regard, whether a sheet processing operation such as a bookbinding processing by the saddle stitcher 714 can be performed is, as described above, based on the sheet processing setting the user sets to the job to be output.

In addition, an inserter 702 is a device for feeding the paper sheet set in an insertion tray 703 to either one of the stack tray 706, the sample tray 704, and the like, without passing the paper sheet through the printer. Thus, the sheets that are set into the inserter 702 can be inserted between the sheets fed into the inline finisher unit (the sheets printed by the printer unit). In the insertion tray 703 of the inserter 702, the user sets the paper sheet in a face-up state, and the paper sheet is fed by a pickup roller, sheet by sheet, firstly from a sheet placed at the top of the stacked sheets. Therefore, the paper sheet fed from the inserter 702 is discharged in the state of face-down, by conveying the sheet to the stack tray 706 or the sample tray 704 as it is.

In feeding the paper sheet to the saddle stitcher 714, after the paper sheet is once fed into the puncher 705, the orientation of the face of the paper sheet is adjusted by feeding the paper sheet, with switching back the sheet. Note that whether the sheet processing operation such as a sheet insertion processing by the inserter 702 can be performed is, as described above, based on the sheet processing setting that the user sets to the job to be outputted.

Still referring to FIG. 7, the trimmer (cutting machine) 710 will be described. A bundle of paper sheets that is made into a booklet (saddle-stitched booklet) by the saddle stitcher 714 is inserted into the trimmer 710. At this time, the paper sheet bundle of the booklet, first, is fed by a predetermined length by the roller. Then, the paper sheet bundle of the booklet is cut by the predetermined length by a cutter unit 712. Next, edges of the paper sheet bundle of the booklet that have been uneven for a plurality of pages within the bundle of paper sheets are properly aligned. Then, the bundle of paper sheet is stored in a booklet holding unit 711. Note that whether the sheet processing operation such as a bookbinding processing by the trimmer 710 can be performed is, as described above, based on the sheet processing setting the user sets to the job to be output.

In this embodiment, the sheet processing setting is included in the print setting information that is constituted by unified printing settings. This is intended to effect the explanation, not to mention, and in a case where the sheet processing setting and the printing setting are processed as information that is independent from each other in an actual apparatus, the sheet processing setting and the print setting are, respectively, the information independent from each other. Therefore, in this embodiment, if the print job is input from the print server 101 to the MFP as PDL data, the sheet processing setting that represents the above-mentioned sheet processing setting is included in the print setting information described in the PDL. In addition, if data is input from the print server 101 to the MFP in the PDF format, the sheet processing setting is included in the job ticket attached to the data.

[Exemplary Computer]

Figure 23:
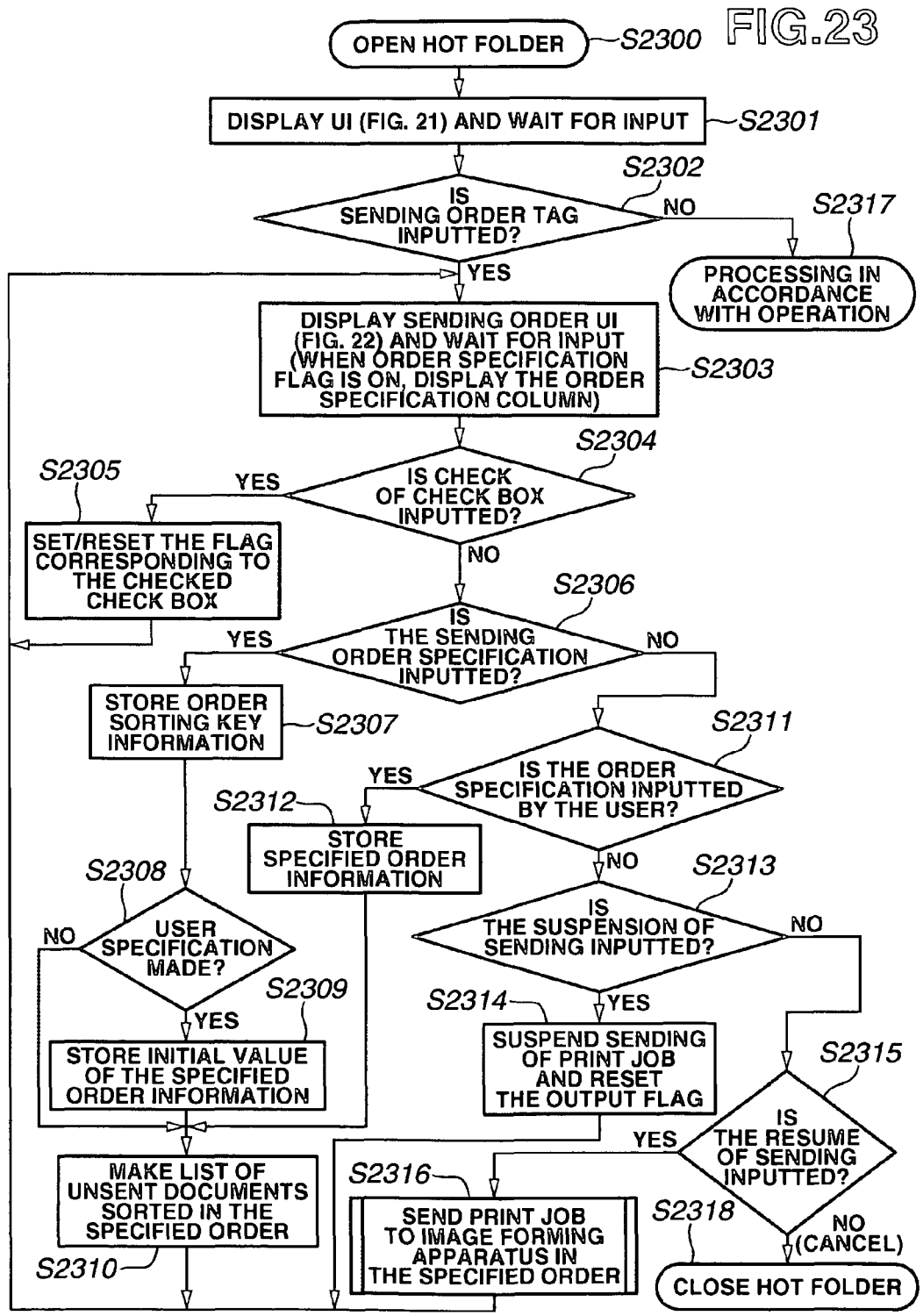
FIG. 23 is a chart showing an exemplary processing flow of a hot folder.
Figure 24:
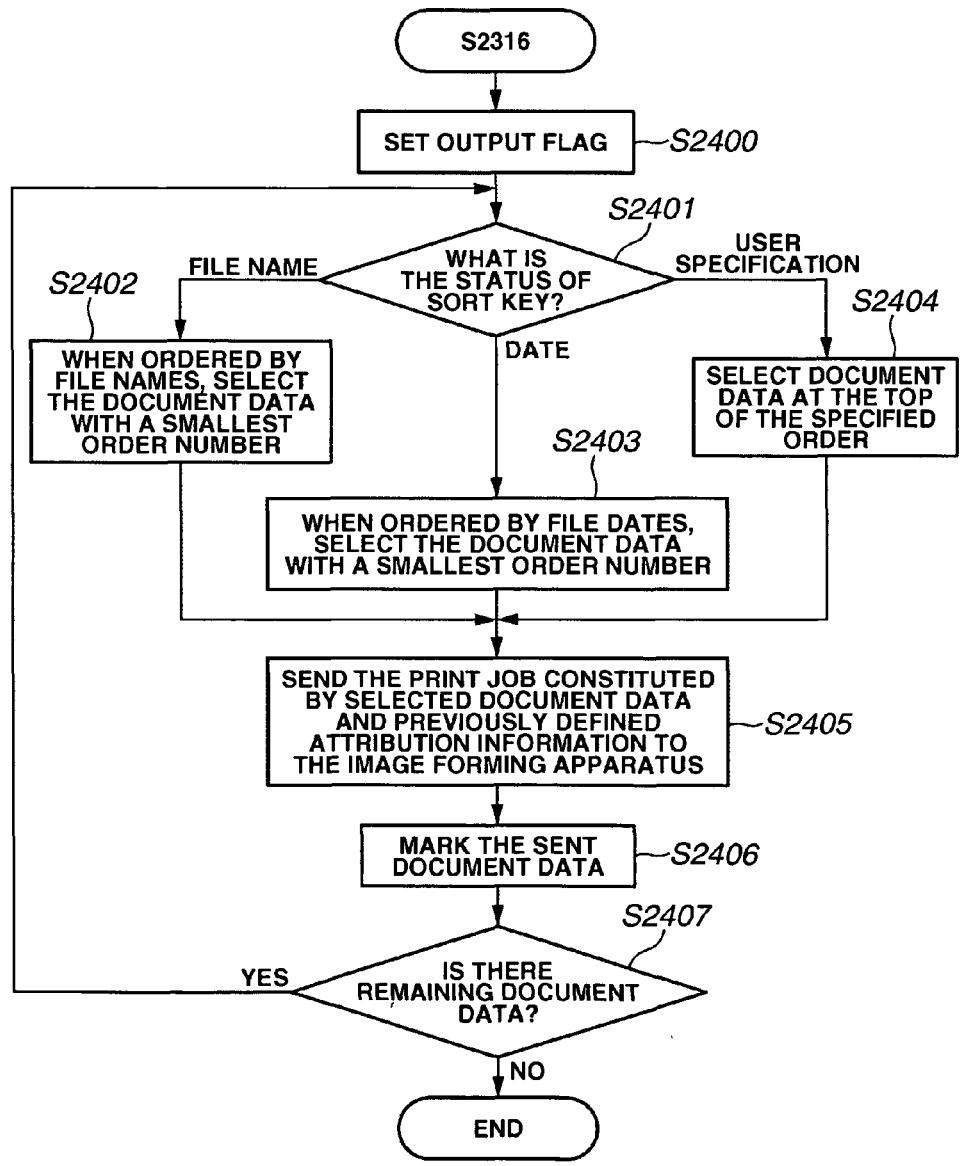
FIG. 24 is a chart showing an exemplary processing flow of a hot folder.
Figure 25:
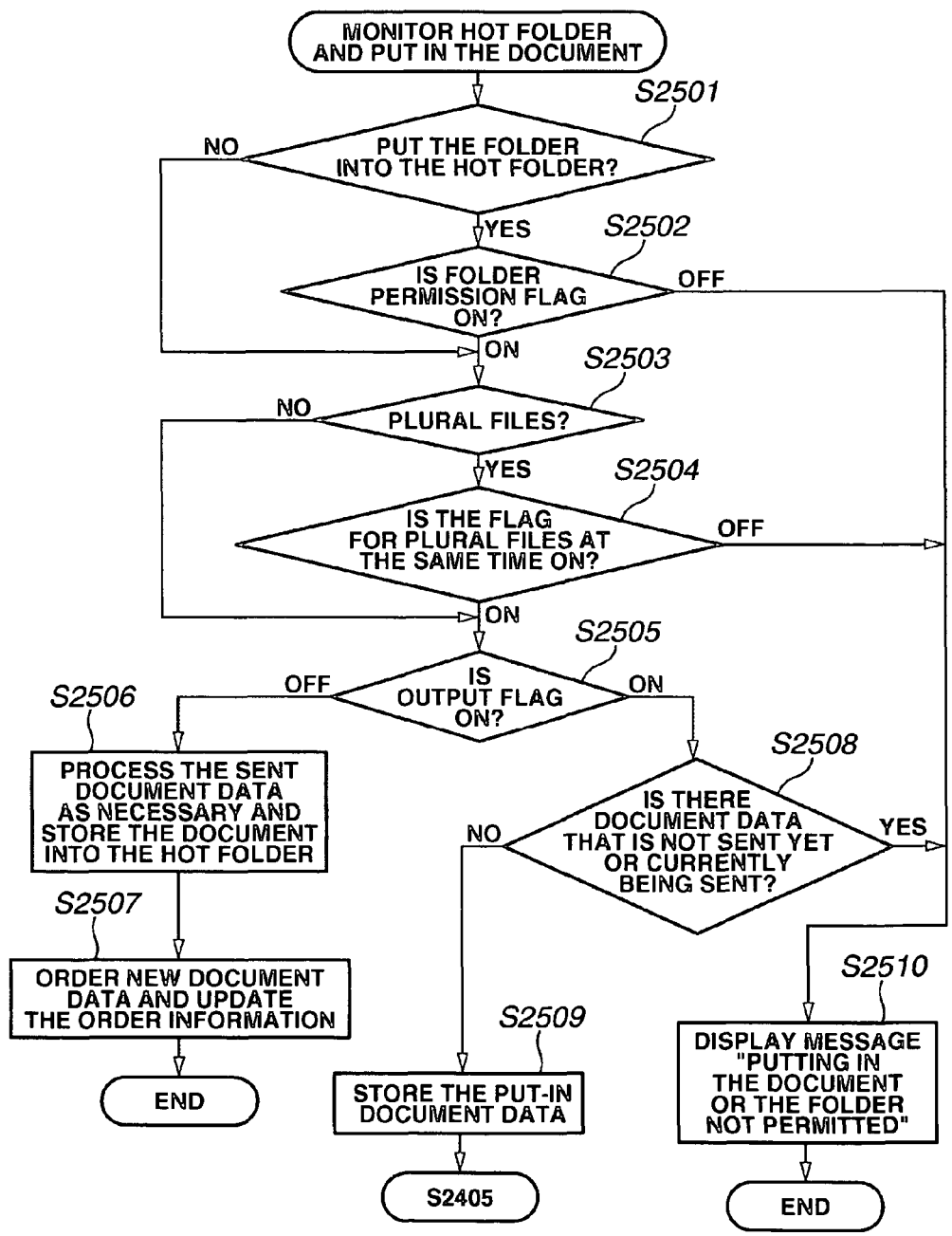
FIG. 25 is a chart showing an exemplary processing flow of a hot folder.
Figure 27:
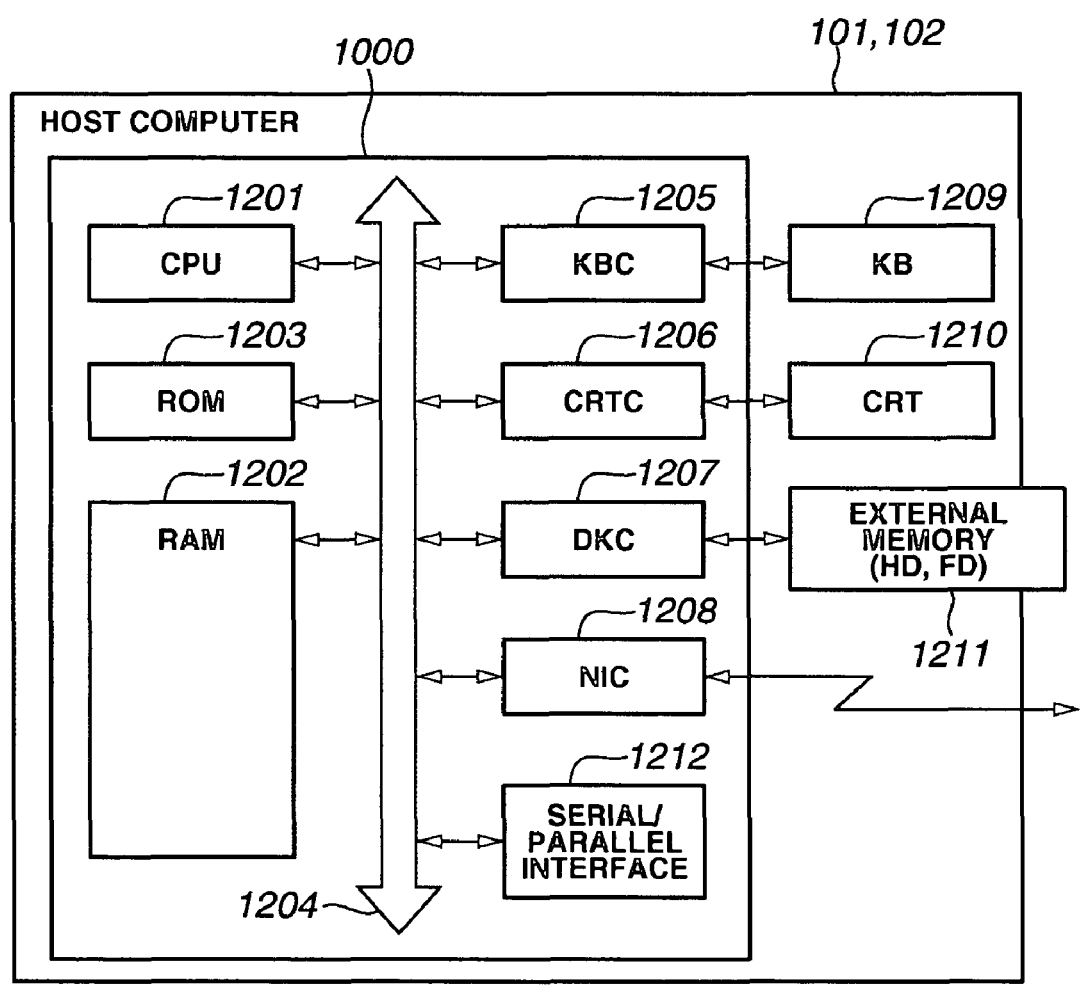
FIG. 27 is a block diagram of an exemplary computer architecture.

FIG. 27 is a block diagram of an computer 1000 that functions as a client computer 102-103, a print server 101, and the like. In FIG. 27, a CPU 1201 of a computer 1000 executes an operating system and system programs such as a printer driver that are stored in a RAM 1202 or a hard disk 1211, and also executes a hot folder program and the like with the process as shown in FIGS. 23 through 25. In addition, a processing for producing and editing the document data that includes a figure, an image, a character, a table (including a spreadsheet and the like) can be performed and the image data photographed by a digital camera can be read and stored, by executing an application program such as a document processing program.

The computer 1000 is controlled over by the CPU 1201. The RAM 1202 functions as a primary memory, a work area, and the like of the CPU 1201. When the hot folder program is executed, the RAM 1202 functions as a storage area of the information, as shown in FIG. 26. A keyboard controller (KBC) 1205 controls a key input from a keyboard 1209 and a pointing device (not shown). A CRT controller (CRTC) 1206 controls a display by a CRT display 1210. A disk controller (DKC) 1207 controls an access to an external memory 1211 such as a hard disk (HD) or an optical disk that stores therein a boot program, various kinds of application programs, font data, a user file, an editing file, and the like.

The aforementioned components (1201-1203, 1205-1208, and 1212) are interconnected and in communication via main bus 1204. A network interface card (NIC) 1208 is an interface for connecting to the network. In addition, the computer 1000 is provided with an interface unit 1212 for locally connecting to the printer. In addition, the program and the data that are described as stored in the RAM 1202 above are stored in the hard disk 1211, and are sometimes loaded to the RAM 1202 as necessary.

[Exemplary Setting Screen of the Printer Driver]

The printer driver is used as a unit for proof outputting the application data by printing devices such as the MFP by using the printing function of the application program that is executed by the client computer 102-103. Also, the printer driver is used as a unit for outputting an end product.

The printer driver performs a processing for converting the application data into the data of a format (for example, the predetermined PDL format) that can be processed by a corresponding printer (including the MFP). In this case, the printer driver refers to the print setting information that is separately stored, and the print setting information is reflected to the data to be produced. Therefore, in this embodiment, the information that indicates the print setting included in the PDL is also referred to as the print setting information.

The printer produces image data on the basis of the data described in the PDL and the print setting information that the printer receives, then prints out the produced image data, and further, performs a post-processing to the printed image data.

Figure 8:
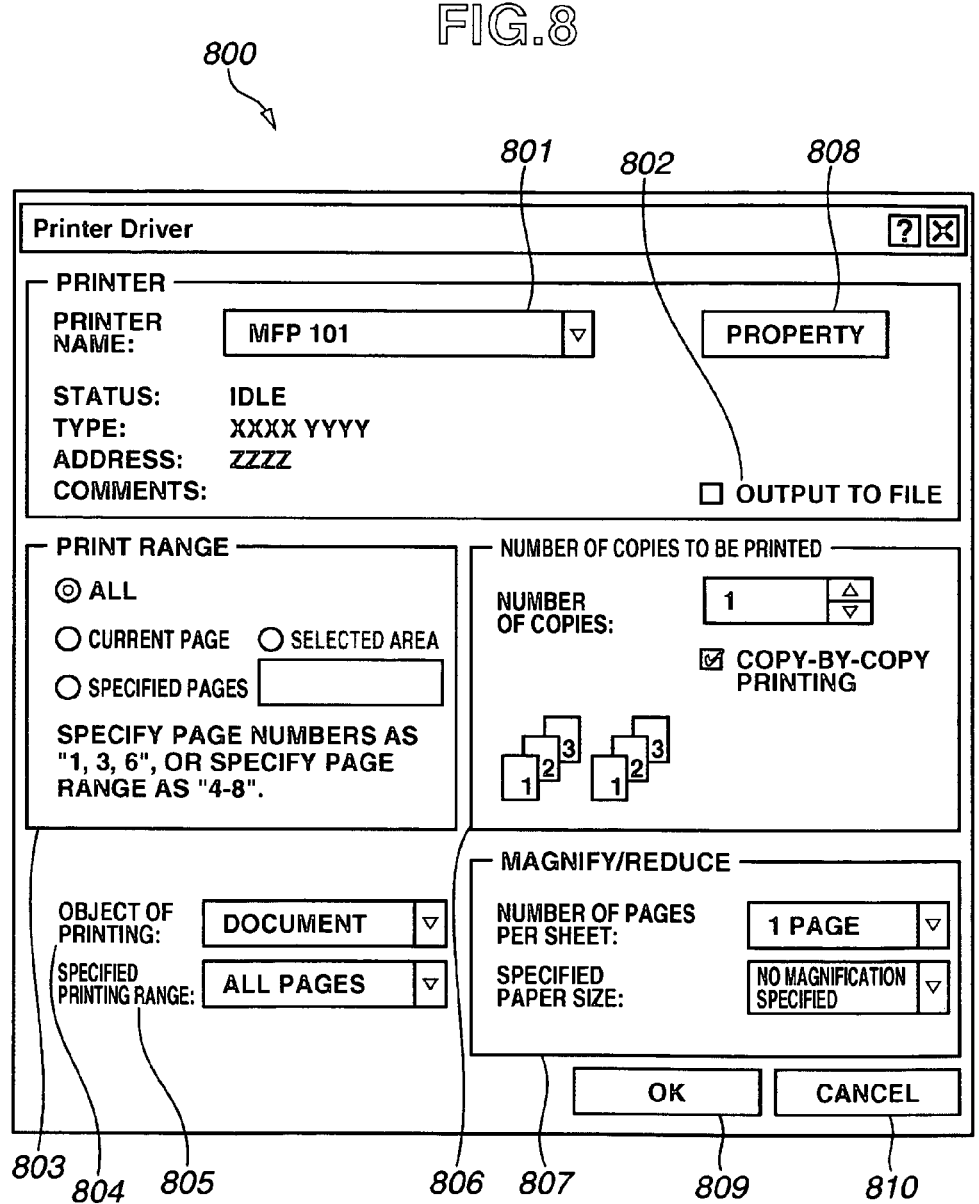
FIG. 8 is a schematic diagram showing an example of a printer driver screen on a client computer.

FIG. 8 is a schematic diagram showing an example of a setting screen 800 displayed by the printer driver for allowing the user to change values for each item of the print setting information. The setting screen 800 of the printer driver is commonly displayed, when an operator prints the print data by a printing device such as the MFP, by selecting a print menu of a print application program.

First, the operator selects the printing device to be used, by a "Printer Name" pulldown list box 801 in the setting screen. Thus, a status of the printing device is displayed in a "Status" column below the "Printer Name" pulldown list box 801. A type of the printer driver is displayed in a "Type" column. Information on an installation location of the printing device is displayed in an "Address" column. Information on comments from an administrator of the printing device is displayed in a "Comments" column.

If the print data is desired to be output as a file without printing out the print data by the printing device, the operator sets an "Output to File" check box 802 to be in a selected state. By a "Print Range" column 803, the pages desired to be printed can be specified by selecting either one of "All", "Current Page", "Selected Area", or "Specified Pages", by a radio button. If the operator selects the "Specified Pages", the operator inputs to an edit box a page number of a page desired to be printed. Further, an attribute of the document data to be an object of printing can be selected by a "Object of Printing" pulldown list box 804. In addition, a specification can be performed by a "Specified Printing Range" pulldown list box 805 as to whether all pages are printed or odd number pages only or even number pages only are to be printed.

In a "Number of Copies to be Printed" column 806, a number of copies to be printed can be inputted into a "Number of Copies" spin box, and also, if a plurality of copies are printed copy by copy, not page by page, the operator sets a "Copy-by-Copy Printing" check box to be selected. In a "Magnify/Reduce" column 807, an N-up printing can be specified by a "Number of Pages per Sheet" pulldown list box. The N-up printing is a printing in which a plurality of pages is laid out in one printing surface of the sheet. Further, the operator can select the paper size in relation to an original size, by a "Specified Paper Size" pulldown list box. The operator can set more detailed print attributes by pressing a "Property" button 808. When the operator ends the setting by the setting screen of the printer driver, the print data can be printed out by the printing device such as the MFP or output as the file, by pressing an "OK" button 809. In order to cancel the printing and the file output, the operator presses the "Cancel" button 810.

The changed print setting information is stored in some cases. However, on the other hand, the changed print setting information is applied only to one print job and is not stored, in other cases. Whether the changed print setting information is stored or not is determined by a printer driver program, for example.

Figure 9:
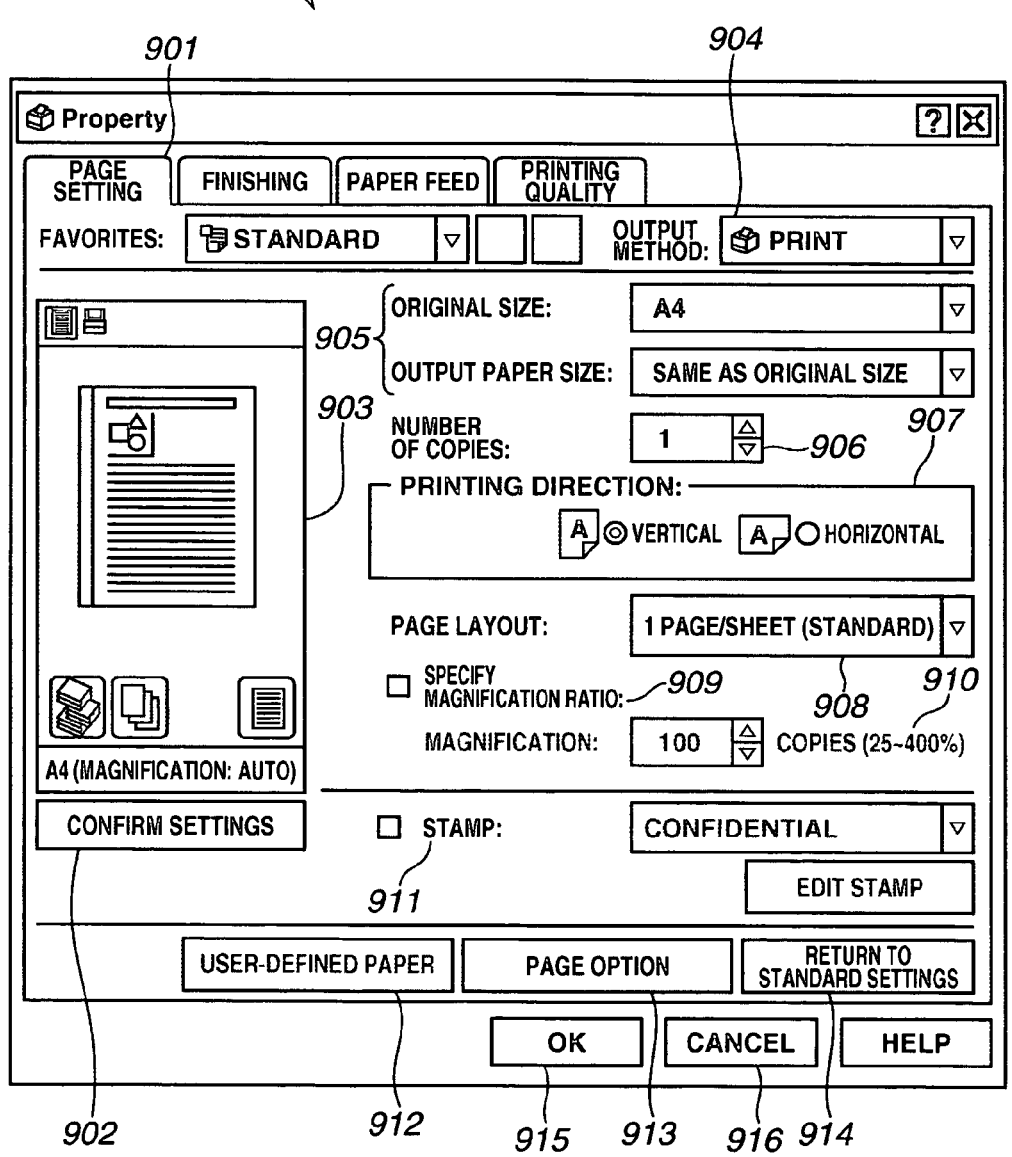
FIG. 9 is a schematic diagram showing an example of a property screen of the printer driver on a client computer.

FIG. 9 is a schematic diagram showing an example screen 900 for setting a property related to a page setting processing of the printer driver. A screen 900 for setting a property of the printer driver is displayed as a default screen at the time of pressing the property button 808 of the printer driver setting screen. In addition, the screen 900 is a screen displayed by selecting a "Page Setting" tab of the screen for setting a property of the printer driver (FIG. 9).

By using a "Favorites" pulldown list box 901, the operator can select a most proper page setting from among predetermined page setting modes. By using two buttons at the left of the "Favorites" pulldown list box 901, the operator can add and edit selected items of the favorites. In addition, contents set through the property setting screen can be displayed as a list by pressing a "Confirm Settings" button 902. The contents set through the property setting screen is reflected to a page image 903 displayed above the "Confirm Settings" button 902. By using an "Output Method" pulldown list box 904, the operator can perform a specification such that the printing device such as the MFP performs a normal printing or a secured printing. Further, by using the "Output Method" pulldown list box 904, the operator can specify an output method. That is, the operator can perform a specification as to whether the data is stored in the hard disk of the printing device or whether the data is edited and previewed by the printing device.

By using an "Original Size" and "Output Paper Size" pulldown list boxes 905, a size of an original to be printed and a size of an output paper of the printing device can be selected. By using a "Number of Copies" spin box 906, the operator inputs a number of copies desired to be printed. By using an "Printing Direction" radio button 907, the direction of the output paper such as "vertical" or "horizontal" can be selected. By using a "Page Layout" pulldown list box 908, the N-up printing (the printing by which a plurality of pages are laid out on one printing surface) can be specified. When the operator sets a "Specify Magnification Ratio" pulldown list box 909 to be selected, the ratio of magnification/reduction can be inputted into a "Magnification" spin box 910 at a ratio indicated by percentage. When the operator sets a "Stamp" check box 911 to be selected, the operator selects a type of the predetermined stamp by using a pulldown list box.

By pressing a "Edit Stamp" button, the type of the stamp can be added and edited. By pressing a "User-Defined Paper" button 912, the use can define a user-defined paper. In addition, the operator can set a more detailed page option by pressing a "Page Option" button 913. In addition, by pressing a "Return to Standard Settings" button 914, the settings can be returned to default values. When the operator ends the setting by the screen for setting the property of the printer driver, the print attributes can be reflected to an actual printing, by pressing an "OK" button 915. In order to cancel the setting by the property setting screen, the operator can press a "Cancel" button 916.

Figure 10:
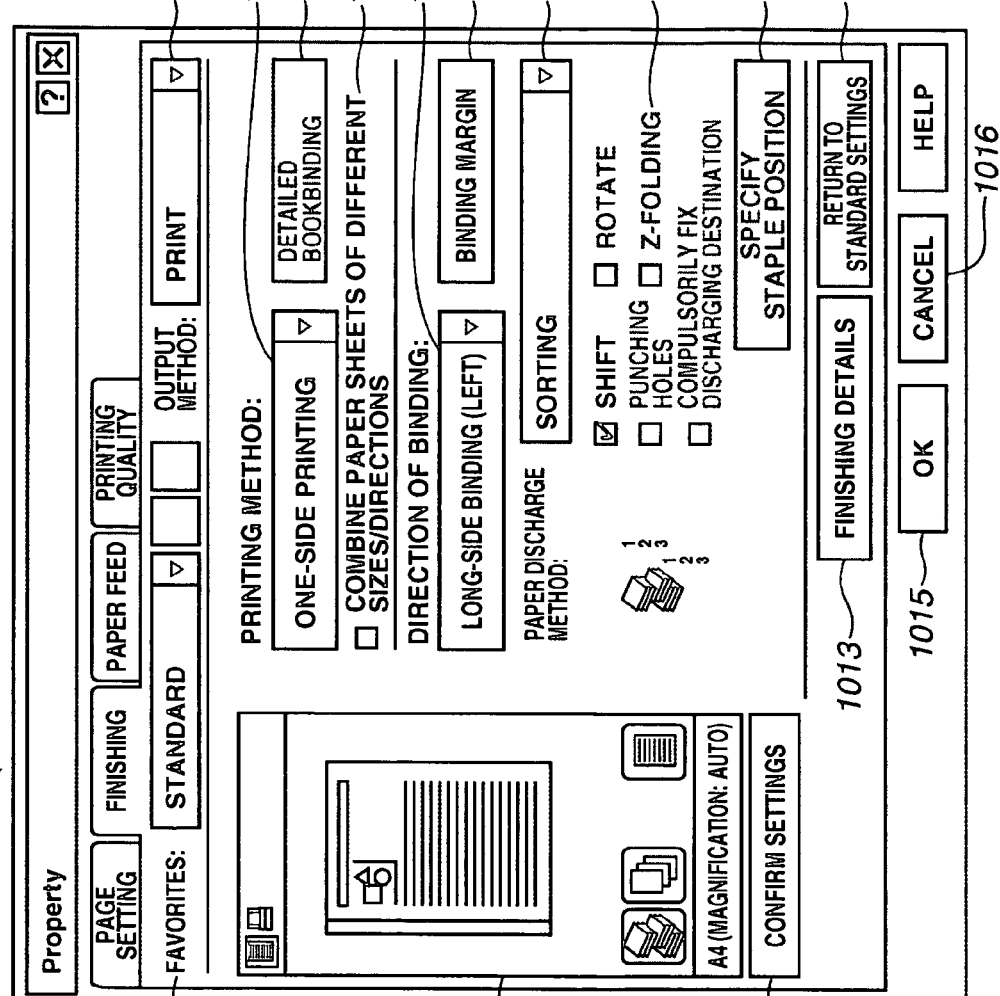
FIG. 10 is a schematic diagram showing an example of a property screen of the printer driver on a client computer.

FIG. 10 is a schematic diagram showing an example an exemplary screen 1000 for setting a property related to a finishing processing of the printer driver. The screen 1000 for setting a property of the printer driver is displayed as a default screen at the time of pressing a "Finishing" tab of the printer driver setting screen shown in FIG. 10. By using a "Favorites" pulldown list box 1001, the operator selects a most suitable page setting from among predetermined page setting modes. By using two buttons at the left of the "Favorites" pulldown list box 1001, the operator can add and edit selected items of the favorites.

In addition, contents set through the property setting screen can be displayed as a list by pressing a "Confirm Settings" button 1002. The contents set through the property setting screen is reflected to a page image 1003 displayed above the "Confirm Settings" button 1002. By using an "Output Method" pulldown list box 1004, the operator can perform a specification such that the printing device such as the MFP performs a normal printing or a secured printing. Further, by using the "Output Method" pulldown list box 1004, the operator can specify an output method. That is, the operator can perform a specification as to whether the data is stored in the hard disk of the printing device or whether the data is edited and previewed by the printing device. By using a "Printing Method" pulldown list box 1005, a printing method such as "One-Sided Printing", "Two-Sided Printing", and "Bookbinding Printing" can be selected.

When combining paper sheets of different sizes and directions, the operator sets a "Paper Sheets of Different Sizes/Directions" check box 1006 to be selected, and then the operator can specify a combination of paper sheets, a method of arranging the sheets, and the width of a binding margin. If "Bookbinding Printing" is selected in the "Printing Method" pulldown list box 1005, the operator can specify a method of bookbinding printing, a direction of turning the pages, and the width of a bookbinding margin, by pressing a "Detailed Bookbinding" button 1007.

Even when either "One-Sided Printing" or "Two-Sided Printing" is selected by the "Printing Method" pulldown list box 1005, the operator sometimes does not make a selection by the "Paper Sheets of Different Sizes/Directions" check box 1006. In this case, by using a "Direction of Binding" pulldown list box 1008, a binding direction such as "Long-Side Binding (Left)", "Long-Side Binding (Right)", "Short-Side Binding (Leading Side)", and "Short-Side Binding (Trailing Side)" can be selected. Further, by pressing a "Binding Margin" button 1009, the width of a binding margin can be specified. By using a "Paper Discharge Method" pulldown list box 1010, a discharge method such as "Sorting", "Grouping", and "Stapling" can be selected. Further, by using a "Shift", "Rotate", "Punch Holes", and "Z-Folding" check boxes 1011, specification can be made as to each such finishing method. In order to compulsorily fix a discharge destination is, the operator can set a "Compulsorily Fix Discharging Destination" check box to be selected.

When the "Staple" is selected by using the "Paper Discharge Method" pulldown list box 1010, a position of stapling can be specified by pressing a "Specify Staple Position" button 1012. The finishing method can be set in a more detailed manner, by pressing a "Finishing Details" button 1013. In addition, by pressing a "Return to Standard Settings" button 1014, the set settings can be returned to a default value. When the operator ends the setting by the screen for setting the property of the printer driver, the print attributes can be reflected to an actual printing, by pressing an "OK" button 1015. In order to cancel the setting by the property setting screen, the operator can press a "Cancel" button 1016.

As described above, the print setting information is input via the above-mentioned user interfaces, and the print job is produced and issued in accordance with the input print setting information, or the input print setting information is stored. User interface screens as shown in FIGS. 8 through 10 are provided by the printer driver.

Settings as to "Attribute Information" for each hot folder that is provided by a hot folder program, which is to be described later below, can also be performed by the similar user interfaces as shown in FIGS. 8 through 10. Input attribute information is stored in relation to the hot folder. Then, in outputting the document data that is stored in the hot folder, the attribute information related to the hot folder serves as the print setting information. That is, the attribute information is sent as the information that defines a print setting (that is, as the job ticket) to the image forming apparatus such as the MFP, together with the document data.

Alternatively, in the case where the document data stored in the hot folder is converted into the PDL and the converted PDL data is sent as the print job to the image forming apparatus, the attribute information is reflected to the PDL, just as in the case of the above-mentioned print setting information.

Reflection of the attribute information to the PDL means that the print setting information in which a value of each setting item of the attribute information (for example, a printing method or a layout) is described is produced and is included in a job header, for example.

[Exemplary Setting Screen of the Web Browser]

In printing data by sending the data from a printing application to the printing device such as the MFP or in copying a paper original, a web application that manages the device and the job is used. The web application in this embodiment may be installed to a device (image forming apparatus such as the MFP) that is provided with a web server, or may be installed to a server provided with the web server, for example, the print server 101. In this embodiment, the web application is installed to the print server 101. If the web application is installed to the device, only the device installed with the web application and the job that is put into the device are managed. If the web application is installed to the server, all the devices controlled over by the server and all the jobs that are put into the devices are managed.

Figure 11:
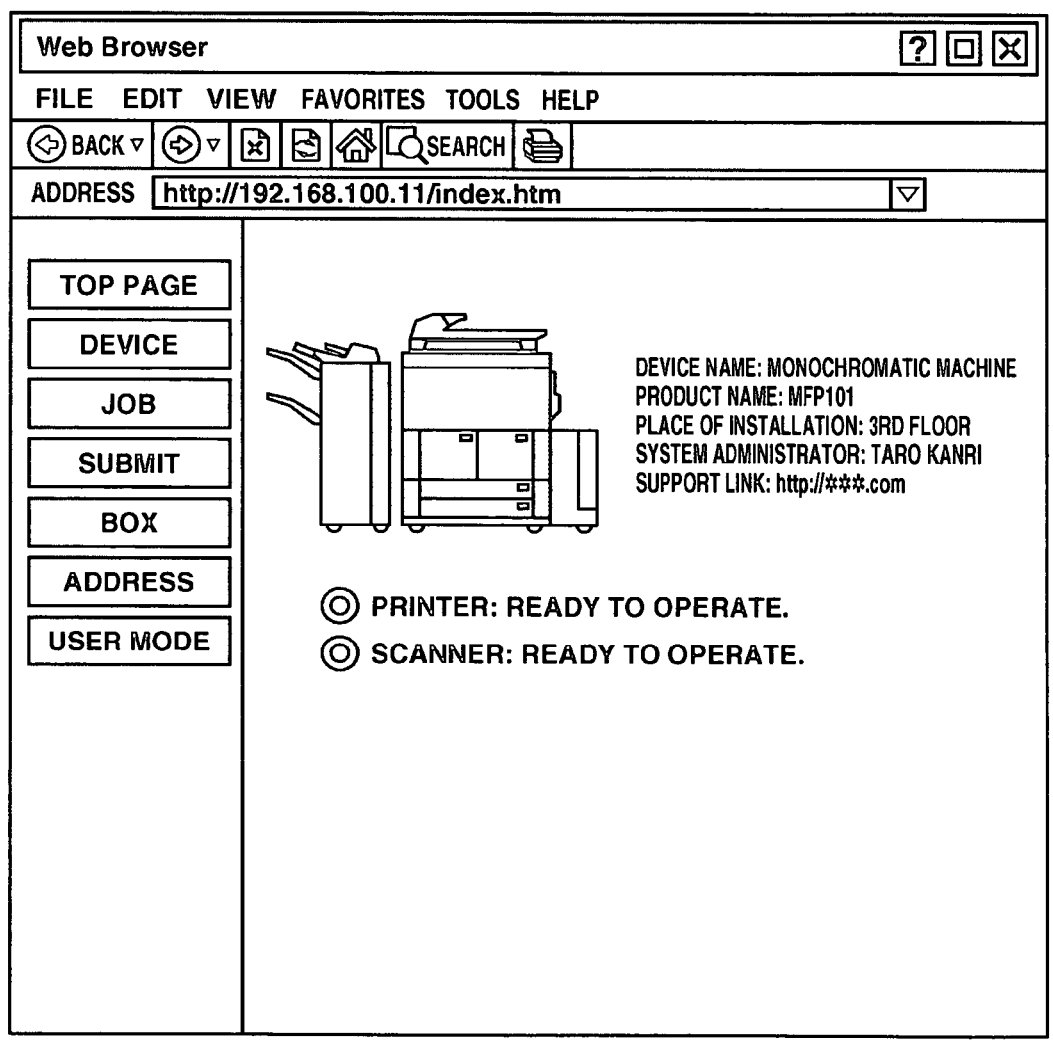
FIG. 11 is a schematic diagram showing an example of a tool for monitoring and controlling the MFP via a web browser of a client computer.

A display screen of the web application is, due to the characteristic of the web application, provided to the client computer by the web server. The web application may be displayed by any client computer or any server, as long as the client computer or the server is provided with the web browser. FIG. 11 is an example of a top page screen 1100 of the web application used for managing the devices and the print job. The top page screen of the web browser is displayed on the following events:

1) When the operator inputs into a URL address input box of the web browser an IP address of the server or the device to which the web application is installed; and
2) When the operator presses a "Top" button included in a left-frame menu of the web browser.

FIG. 11 shows an exemplary screen of the "Top" page 1100. FIG. 11 shows an example in which an IP address of "192.168.100.11" is input as the URL address of the web browser. Under an environment where a domain name system (DNS: a system that provides a service for identifying an IP address from a host name on a TCP/IP network such as the Internet) is supported, a server name may be inputted instead of the IP address.

In the left-frame menu of the top page screen of the web browser, buttons "Top Page", "Device", "Job", "Submit", "Box", "Address", and "User Mode" are arranged. By using the buttons, shifting to each page can be performed. In a right frame of the top page screen of the web browser, an illustration showing an outline external appearance of the device is displayed. In addition, a device name, a product name, a place of installation, a system administrator, and a support link are displayed. In addition, in the right frame of the top page screen of the web browser, a signal light indicating a state of the printing device and the scanning device is displayed, and also, a character string indicating the state of the printing device and the scanning device is displayed.

Figure 12:
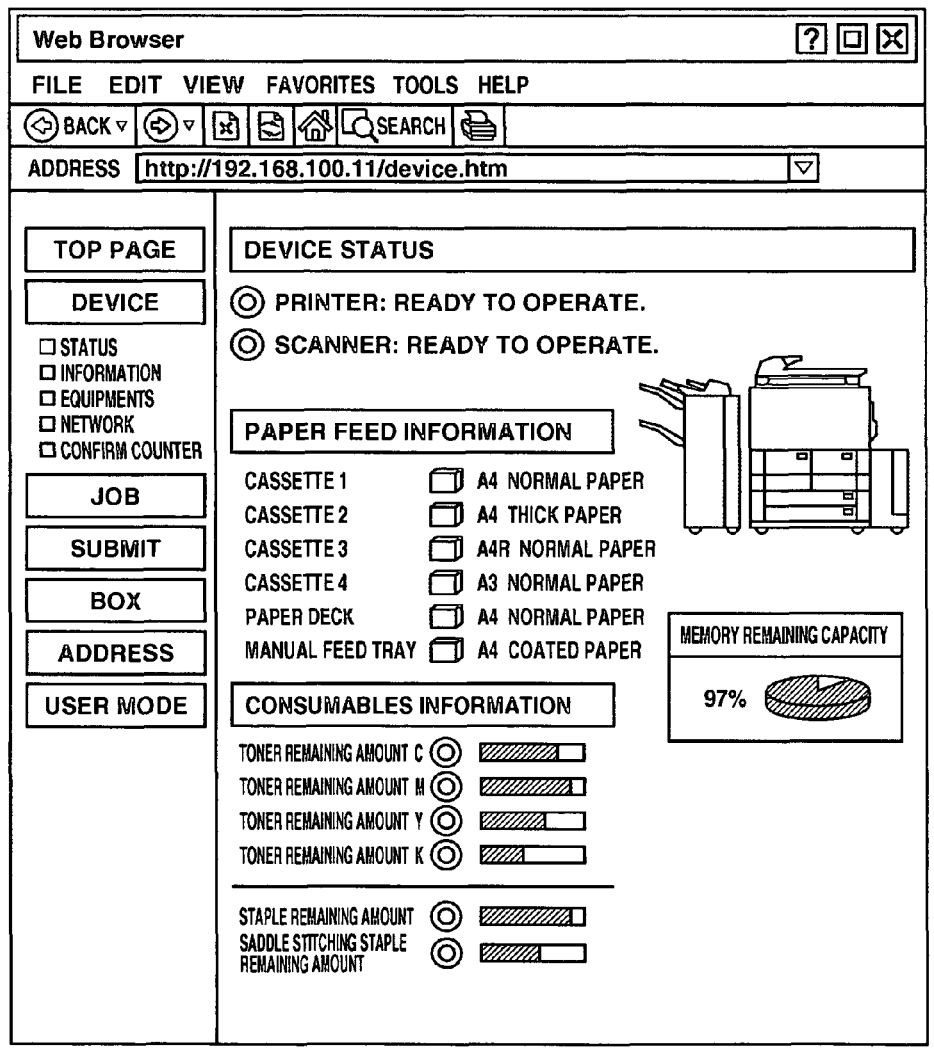
FIG. 12 is a schematic diagram showing an example of a tool for managing a device via a web browser of a client computer.

FIG. 12 is a schematic diagram showing an example of a device management screen 1200 of the web application used for managing a state of the device. The device management screen 1200 of the web browser is a screen of the "Device" page that is displayed by pressing the "Device" button arranged in the left-frame menu of the web browser.

In the "Device" page, as shown in the left-frame menu of the web browser, sub pages that are made active by using each of sub menus of "Status", "Information", "Equipments", "Network", and "Confirm Counter". In FIG. 12, among the sub pages, the "Status" page only is shown. In the right frame of the device management screen of the web browser, various kinds of information such as "Device Status", "Paper Feed Information", "Consumables Information", "Device Outline External Appearance", and "Memory Remaining Capacity" are displayed.

In the "Device Status" column, a signal light indicating a state of the printing device and the scanning device is displayed, and also, a character string indicating the state of the printing device and the scanning device is displayed. In the "Paper Feed Information" column, a paper remaining amount, the paper size, the paper type of the paper sheets stored in each paper feed stage such as the paper cassette, the paper deck, and the manual paper feed tray are displayed with an icon and a character string.

In the "Consumables Information" column, a toner remaining amount for each of colors of C, M, Y, and K, a staple remaining amount, and a saddle stitch bookbinding staple remaining amount are displayed by a signal light and an indicator. Further, in the screen, an illustration indicating the outline external appearance of the device is displayed. In addition, in "Memory Remaining Capacity", a remaining capacity of the memory such as the hard disk is displayed by an indicator of a circular graph. By referring to the device management screen of the web browser, the state of the device to be an object of the management in pre-processing and post-processing can be checked.

FIG. 13 is a schematic diagram showing an example of a constitution of a job management screen 1300 of the web application used for managing the status of the job. The job management screen of the web browser is a screen of the "Job" page displayed upon pressing of the "Job" button arranged in the left-frame menu of the web browser. In the "Job" page, as shown in the left-frame menu of the web browser, there are sub pages that are made active by using each sub menu button such as "Print Job", "Printed Jobs", "Copying Job", "Sending Job", and "Receiving Job".

FIG. 13 shows only the "Print Job" page among the sub pages. In the right frame of the job management screen of the web browser, a list of jobs that are put into the device to be managed and are not printed yet is displayed. In the example shown in FIG. 13, information such as "No.", "Status", "Control", "Job Name", "Priority", "Number of Pages", and "Number of Copies" is displayed. In the "No." column, an identification number of the job is displayed. In the "Status" column, a job status such as "Printing", "Standing By", "RIP", and "Held" is displayed.

In the "Control" column, "Erase", "Suspend", and "Resume" buttons are arranged so that each job can be erased, suspended, and resumed. In the "Job Name" column, a name of the job is displayed. In the "Priority" column, a priority of the job such as "High", "Middle", and "Low" is displayed. In the "Number of Pages" column, a number of pages of the job is displayed. In the "Number of Copies" column, a number of copies to be printed of the job is displayed.

Figure 14:
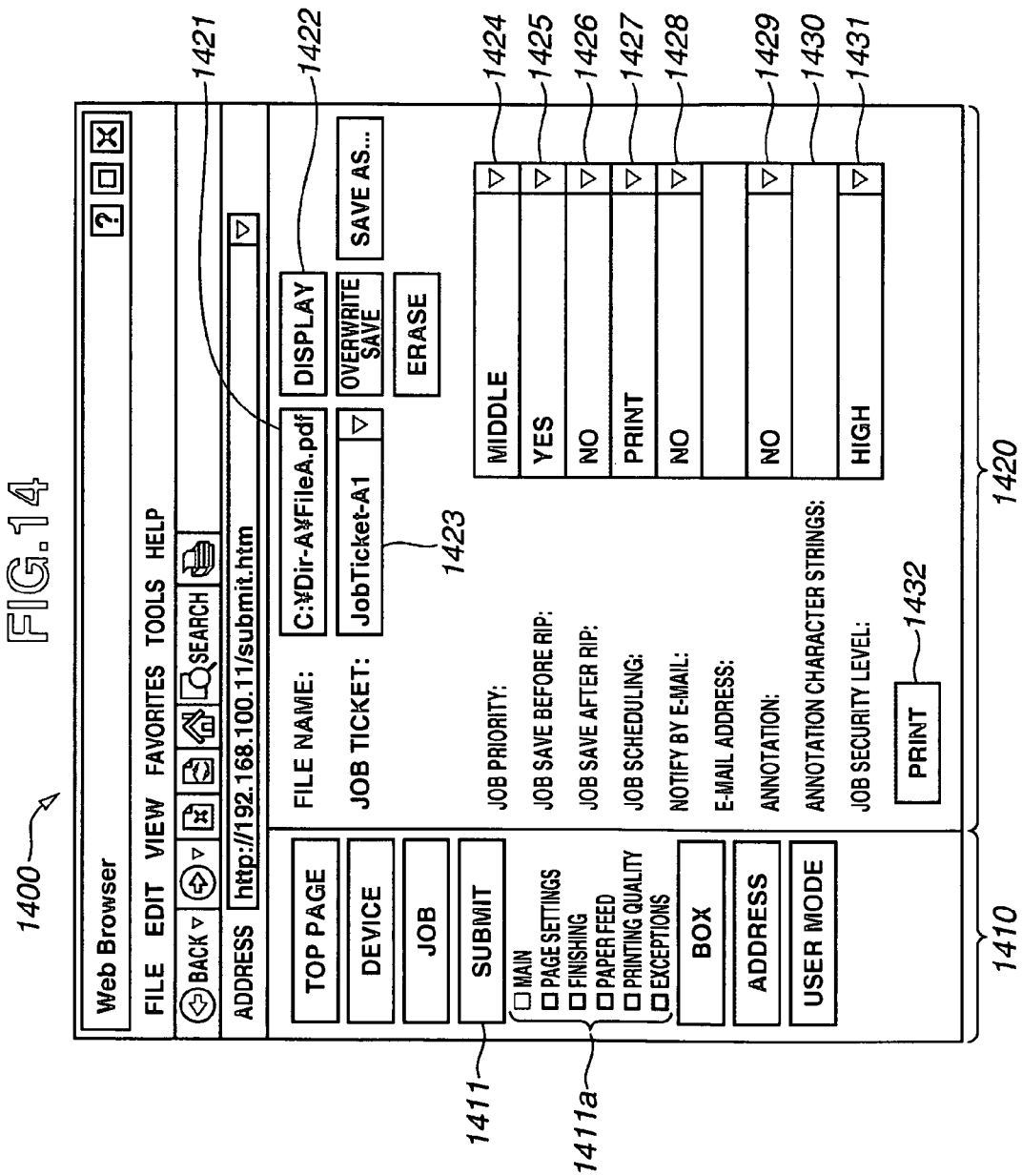
FIG. 14 is a schematic diagram showing an example of a tool for putting in a job via a web browser of a client computer.

FIG. 14 is a schematic diagram showing an example of a job submission screen 1400 of the web application used for submitting a new job. The job submission screen shown in FIG. 14 is a screen in the "Submission" page that is displayed upon pressing of a "Submit" button 1411 arranged in the left-frame menu 1410 of the web browser. In the "Submission" page, as shown in the left-frame menu of the web browser in FIG. 14, there are sub pages that are made active by using each sub menu 1411a such as "Main", "Page Settings", "Finishing", "Paper Feed", "Printing Quality", and "Exceptions".

In a right frame 1420 in the job submission screen of the web browser, an attribute of the job to be newly submitted to the device that is an object of the job submission is set. In "File Name" box 1421, a file name that is a content of a newly submitted job can be inputted. Further, by pressing a "Display" button 1422, a file specified by using the "File Name" box 1422 can be previewed. By using a "Job Ticket" pulldown list box 1423, a job ticket to be related to a newly submitted job, among the job tickets previously stored, can be selected. The job ticket that is selected by using the "Job Ticket" pulldown list box 1423 can be overwritten by using an "Overwrite Save" button after changing a setting, can be saved as a new file by changing a job ticket name by using a "Save As . . ." button, and can be erased by using an "Erase" button.

By using a "Job Priority" pulldown list box 1424, a job priority such as "High", "Middle", or "Low" can be selected. By using a "Job Save before RIP" pulldown list box 1425, the operator can make a selection as to whether the job that has been submitted to the device before being subjected to the RIP is stored in a memory such as a hard disk. By using a "Job Save after RIP" pulldown list box 1426, the operator can make a selection as to whether the job that has been submitted to the device after being subjected to the RIP is stored in a memory such as a hard disk.

By using a "Job Scheduling" pulldown list box 1427, the operator can make a specification as to whether the submitted job is printed as it is, whether the submitted job is held before the RIP, and whether the submitted job is held after the RIP. By using a "Notify by E-Mail" pulldown list box 1428, the operator can make a selection as to whether to issue notification by an electronic mail upon completion of the job submitted to the device. If the operator desires to issue the notification, the operator inputs an electronic mail address of a sending destination in an "Electronic Mail Address" box.

By using an "Annotation" pulldown list box 1429, the operator can make a selection as to whether to add an annotation as a watermark to contents of the job submitted to the device. If the operator desires to add the annotation, the operator can input annotation character strings in an "Annotation Texts" box 1430. By using a "Job Security Level" pulldown list box 1431, a security level of the job such as "High" and "Low" can be selected. When all the settings are completely performed for pages of "Page Settings", "Finishing", "Paper Feed", "Printing Quality", and "Exceptions", except for the "Main" page, a new job can be submitted by pressing a "Print" button 1432. Items that can be set in these pages are the same as the items that can be set by the user interface of the printer driver, namely, "Page Settings", "Finishing", "Paper Feed", "Printing Quality", and the like.

In addition, the user interface shown in FIG. 14 can be applied in setting the attribute information of the hot folder, instead of the user interface equivalent to the user interface used in performing the setting of the printer driver. Note that when the job ticket is specified and if there is an item overlapping in the print settings defined in relation to the job ticket and the print setting that can be inputted by using the sub menu in the job submission page, either item may be prioritized.

[Exemplary Method for Putting a Plurality of Files into the Hot Folder]

Now, an exemplary method for putting the document data (document files) into the hot folder is explained with reference to FIGS. 15 through 20. First, it is necessary to previously produce the hot folder and print files. Here, note that in FIGS. 15 through 20, an example is shown by using a hot folder "HotFolder_1" (1500) and print files "File-A", "File-B", and "File-C".

Operations shown in FIGS. 15 through 20 can be performed in a state where an icon 1501 that indicates the produced hot folder and an icon of the document data to be printed are displayed by using an "explorer" program of Windows (registered trademark) or displayed on a desktop window.

The screen is displayed by the client computer 102-103 that utilizes the hot folder. Note that in this embodiment, the hot folder is provided by the print server 101. On the other hand, in many cases, the client computer 102-103 includes therein the document data. Accordingly, although the hot folder and the document data may be displayed on the same screen, the hot folder and the document data may exist in computers physically different from each other.

Figure 15:
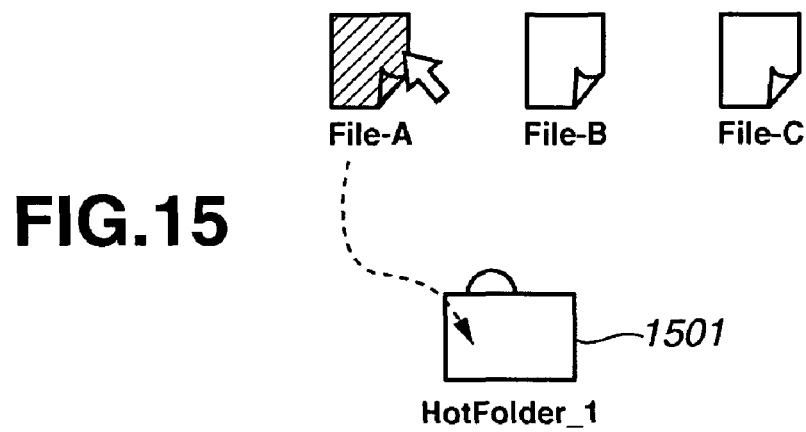
FIGS. 15-17 illustrate an exemplary method for putting a plurality of jobs into a hot folder.
Figure 16:
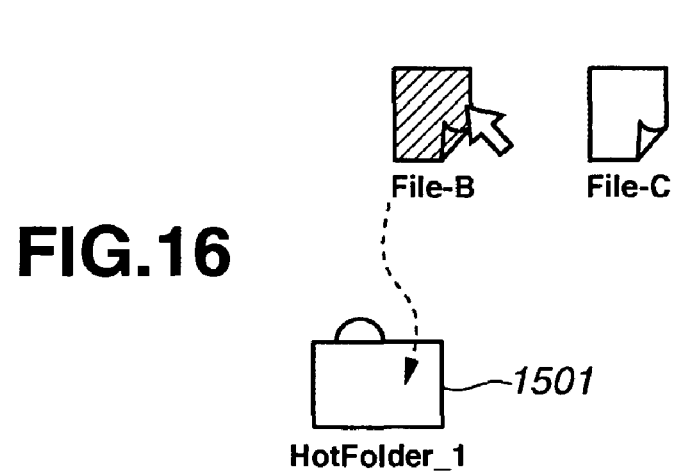
Figure 17:
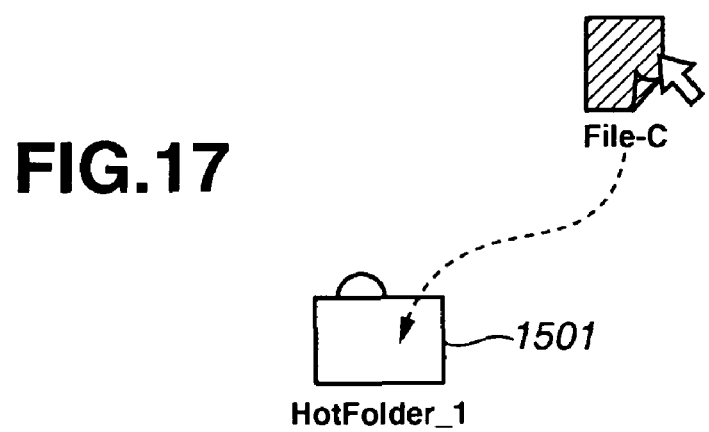

FIGS. 15 through 17 respectively show a method in which three files are put into the hot folder file by file. The operator selects the file File-A by clicking an icon of the file File-A, drags and drops the file File-A into the hot folder HotFolder_1 (FIG. 15). The operator selects the file File-B by clicking an icon of the file File-B, drags and drops the file File-B into the hot folder HotFolder_1 (FIG. 16). The operator selects the file File-C by clicking an icon of the file File-C, drags and drops the file File-C into the hot folder HotFolder_1 (FIG. 17).

By the above operations, the data of the three documents that are related to the icons of the document data can be put into (in other words, moved into or copied to) the hot folder HotFolder_1 that is related to the hot folder icon 1501. In this method, the drag-and-drop operation is performed file by file, and accordingly, there is a time difference from a start of putting in a first file to a completion of putting in a last file.

FIGS. 18 through 20 respectively show an exemplary method in which three files are simultaneously put into the hot folder. In this method, first, the files that are to be simultaneously put in are selected. FIG. 18 and FIG. 19 show the operation performed in selecting the files File-A, File-B, and File-C. When all of the files File-A, File-B, and File-C are properly selected, the selected files are simultaneously dropped all together into the hot folder HotFolder_1 (FIG. 20). By the above operation, three files can be simultaneously put in all together into the hot folder HotFolder_1.

In this method, an instruction for putting in the files can be issued in relation to all of the files desired to be put into the hot folder. However, moving and copying of the files are performed file by file, there is a time difference from a start of putting (moving or copying) of a first file into the hot folder to a completion of putting (moving or copying) of a first file into the hot folder. In particular, the time difference is smaller than the time difference in the case of the method in which the files are put into the hot folder file by file as shown in FIGS. 15 through 17. Thus, the document data that is put into the hot folder is sent to the MFP by the operation of the hot folder program that monitors the hot folder, and then is printed.

[Exemplary Setting Screen of the Hot Folder]

Figure 21:
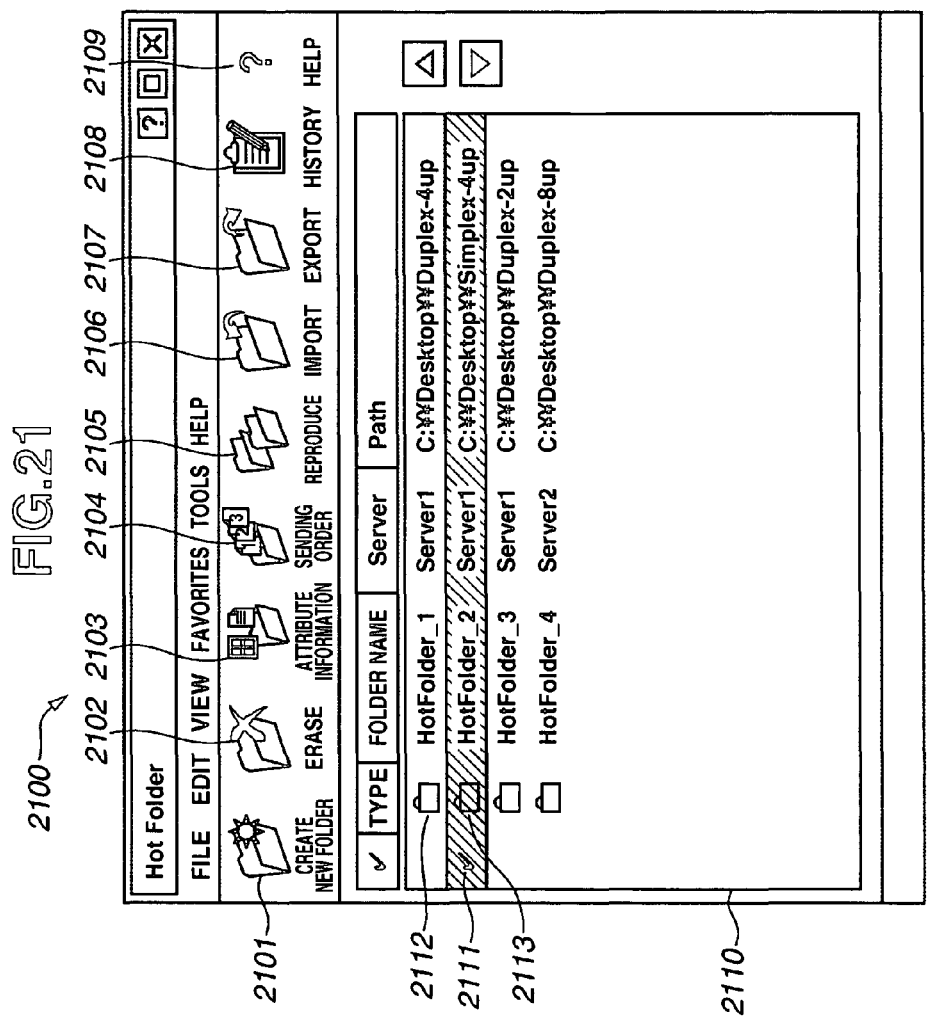
FIG. 21 is a schematic diagram showing an exemplary main screen of a hot folder.

FIG. 21 is a schematic diagram showing an exemplary main screen 2100 of the hot folder. Through this screen 2100, the user can produce a folder and perform setting of attribute information and of a print order that is one example of an output order. The screen 2100 shown in FIG. 21 is displayed when an item for clearly displaying the hot folder is selected, for example, from a menu provided by the hot folder program that is resident in a memory and executed as a background task. An explanation is made as to operations performed from a production of a new hot folder to a setting of the printing, with reference to the setting screen 2100 shown in FIG. 21.

First, when the operator presses a "Create New Folder" button 2101 in the setting screen, one new hot folder can be created. In accordance with this operation, the folder is newly created at a specified position (within a folder), and the newly created folder is registered as a hot folder that is monitored by the hot folder application. By this processing, the newly created hot folder is displayed in a folder list 2110. FIG. 21 shows a state where four hot folders, namely, HotFolder_1, HotFolder_2, HotFolder_3, and HotFolder_4, are created. These folders are monitored and processed by the hot folder program. Here, printing attributes of the created hot folder can be set (or changed). In this order, the operator, first, selects a folder the operator desires to perform settings to from the folder list 2110.

FIG. 21 shows a state where the hot folder HotFolder_2 (2113), which is checked by selecting a check mark 2111, is selected. When an attribute information setting button 2103 is pressed in this state, a screen for setting a print attribute is opened. The print attribute is equivalent to the print setting information as explained in the explanation of the user interface of the printer driver. On the other hand, the hot folder HotFolder_1 (2112) is an example of a hot folder which has not been selected.

Setting items are the same as the setting items in setting the property of the printer driver. Accordingly, the setting items in the property setting screen of the printer driver (FIGS. 8 through 10), for example, can be used. However, in this case, a title of the screen is different from the title of the screen in the case of setting the property of the printer driver. Here, the setting can be performed by using the same screen as the property setting screen shown in FIG. 9 and FIG. 10. For the items to be set, there are a paper size, a number of copies to be printed, settings for one-sided or two-sided printing, and the like.

In addition, a "Reproduce" button 2105 for reproducing a folder is provided. Further, an "Import" button 2106 for putting new document data into the hot folder is provided to the screen. Further, the screen is provided with a button such as an "Export" button 2107 for extracting the document data in the hot folder, a "History" button 2108 for inquiring history information of printing and the like. Also, a "Help" button 2109 is provided for the help function.

The putting in of the document data to the hot folder, whose method is explained with reference to FIGS. 15 through 20, can also be performed by pressing the "Import" button 2106 in a state where the document data is selected. Note that the attribute information obtained as a result of the setting is stored in relation to the selected hot folder, separately from the print setting information.

[Exemplary Setting of Sending Order]

Figure 22:
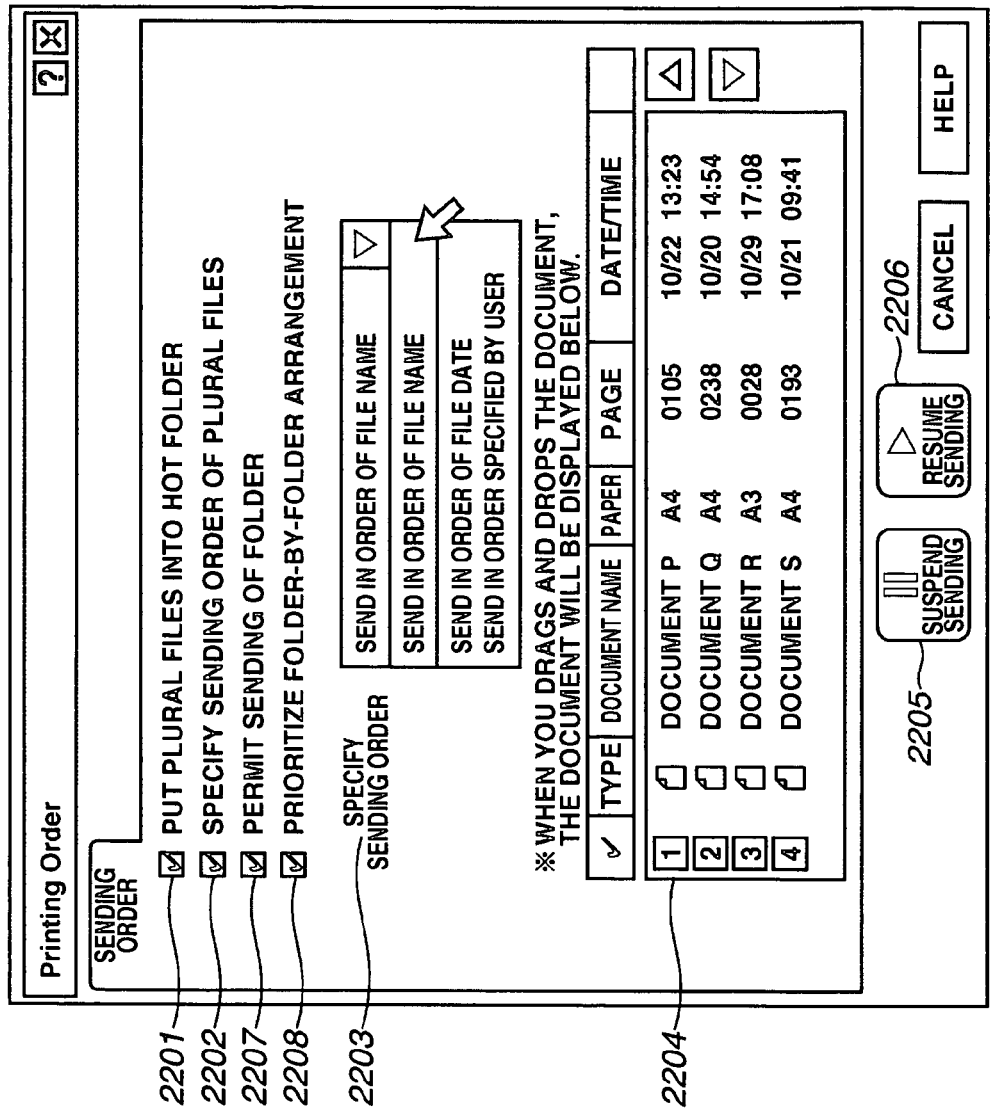
FIG. 22 is a schematic diagram showing an exemplary screen for setting an order of sending of jobs in a hot folder.

By using the hot folder program according to this embodiment, the operator can perform a setting of an order of sending of the print jobs to the image forming apparatus, via a user interface shown in FIG. 22. For example, when the operator presses a button 2104 (see FIG. 21) for setting an order of sending to the image forming apparatus in a state where the hot folder HotFolder_2 is selected, as shown in FIG. 21, a screen 2200 for setting an order of sending to the image forming apparatus (FIG. 22) is displayed. In this state, the order of sending of the print job based on the document data that is put into the selected hot folder can be set.

FIG. 22 shows an exemplary screen 2200 for setting an order of sending of the document data that is put into the selected hot folder to the image forming apparatus. By using a check box 2201, the operator can perform a setting as to whether to allow a plurality of files to be simultaneously put into the hot folder in a method that is described later below, as an attribute of the hot folder. If the check box 2201 is checked (that is, the setting is performed so that the plural files can be simultaneously put into the hot folder), a check box 2202 that is arranged just below the check box 2201 becomes active and the operator can perform a setting by using the check box 2202.

By using the check box 2202, the operator can perform a setting as to whether a setting of an order of sending of a plurality of files that is put into the hot folder to the image forming apparatus is performed or not. If the check box 2202 is checked (in other words, if the setting is performed so as to specify the sending order), a pulldown menu 2203 for specifying an order of sending to the image forming apparatus, which is arranged just below the check box 2202, becomes active. By using the pulldown menu 2203, the operator can specify an order of sending of the plural files to the image forming apparatus.

In FIG. 22, three types of the order of sending are shown, namely, "Send in Order of File Name", "Send in Order of File Date", and "Send in Order Specified by User". When the "Send in Order Specified by User" is selected, the operator performs an operation of moving the files selected within a file list 2204, for example, with respect to each of the files in the selected hot folder, to specify an order of the files. If the "Send in Order of File Name" is selected, the print job produced based on each file is sent to the image forming apparatus, in an order sorted by a file name provided to each file as one item of the attribute of the file, as a sort key. In the case where the "Send in Order of File Date" is selected, the same applies except that the sort key is the file date, instead of the file name.

Note that FIG. 22 shows an example of a specification menu, and the specification may be made with using other attribute items as the key. For example, a size and a type of the files can be specified as the sort key. In addition, a plurality of attribute items can be specified as the key to specify a priority of each attribute item. For example, suppose that the file date and the file name are specified as the sort key, the file date is primarily prioritized, and the file name is secondarily prioritized. In this case, if there are plural files of the same date, the print job corresponding to each file is outputted in an order in which the files are sorted out, among the files of the same date, with the file name as the sort key. Thus, when the plural files are simultaneously put into the folder, the order of sending to the image forming apparatus can be specified.

Note that if the check box 2201 by which whether it is permitted to simultaneously put in plural files in a method described later below is set is not checked, when there exist the files in the hot folder, a new file cannot be put into the hot folder.

[Exemplary Instruction for Start of Printing from the Hot Folder]

Next, an explanation is made as to a "Suspend Sending" button 2205 and a "Resume Sending" button 2206 shown in FIG. 22. In the explanation below, a description to the effect that the files are sent to the image forming apparatus means that the print job for printing the data of the files is sent to the image forming apparatus.

As described above, in putting plural files into the hot folder, there is a time difference from a start of putting in the first file to a completion of putting in the last file. If the hot folder starts the sending of the files to the image forming apparatus during the time difference, the file that is put in after the start of sending cannot be sent as the first file. In other words, the files may sometimes be sent in a order different from the order of sending to the image forming apparatus that is previously set. In this regard, it is necessary to start the sending of the files to the image forming apparatus after the putting in of the files to the hot folder is completed.

For example, the user presses the "Suspend Sending" button 2205 to issue an instruction to the hot folder of suspension of sending, before the files are put into the hot folder. When all the files desired to be printed are put into the hot folder, the operator instructs the resume of sending by pressing the "Resume Sending" button 2206. Thus, the start of sending during the process of putting the plural files into the hot folder can be prevented. That is, the sending from the hot folder can be performed in accordance with the order set by the sending order setting screen 2200 (see FIG. 22).

Note that with respect to the selected hot folder, a state where a sending of the print job is temporarily stopped is hereinafter referred to as a "suspension state", and a state where the sending is performed is hereinafter referred to as a "sendable state". Thus, the user can issue an explicit instruction to bring the hot folder in the suspension state to the sendable state. Therefore, desired files can be put into the hot folder in the suspension state.

Each file that is put into the hot folder in the suspension state is not sent to the image forming apparatus in this state. Thus, when the user issues an instruction for switching the state of the hot folder to the sendable state, the files can be sent to the image forming apparatus in the order specified by the user. In addition, it is preferable that the hot folder program prohibits a new putting of the files into the hot folder in the sendable state. Thus, the sending of the files in a wrong order can be prevented.

[Exemplary Sending from the Hot Folder]

The hot folder, when it is in the sendable state, rearranges the print files in the folder in accordance with the setting of the sending order. When the rearrangement of the files is completed, the hot folder sends the print files to the image forming apparatus in the specified or desired order.

[Relationship Between the Order of Sending from the Hot Folder and the Print Order in the Image Forming Apparatus]

The order of printing by the image forming apparatus is sometimes different from the order of sending of the files from the hot folder. This is caused in relation to sending through the network and the print processing in the image forming apparatus. For the method for matching the orders, there are some methods such as the method as disclosed in Japanese Patent Application Laid-Open No. 04-096822 and Japanese Patent Application Laid-Open No. 11-065784.

By using the known technologies, the files are printed by the image forming apparatus in accordance with the order of sending of the files from the hot folder. For example, information indicating the order specified by the user by the user interface shown in FIG. 22 (an example of the information is shown in FIG. 26) is sent together with the print job to the image forming apparatus, and then the image forming apparatus carries out the image forming in accordance with the order indicated by the sent information. In this regard, when the files are sorted by using the specified key to impart each file with the order information to send the files having the order information to the image forming apparatus together with the print job, the image forming apparatus can perform the printing operation in the specified order.

Note that when the hot folder program is executed by the print server 101 and when the print server 101 and the image forming apparatus are mutually and locally connected by the serial interface and the like, it is highly likely that the files are printed in accordance with the order of sending of the print jobs from the print server 101. Therefore, it is not necessary to consider or countermeasure the disagreement between the order of sending from the print server 101 and the order of outputting by the image forming apparatus.

[Exemplary Operation Sequence of the Hot Folder Program]

Hereinbelow, an exemplary operational process of the hot folder program is explained with reference to FIGS. 23 through 26. First, exemplary data shown in FIG. 26 is explained. In FIG. 26, an example of sending order information 2600, attribute information 2610, and a folder identifier 2620, each of which is defined per hot folder, is shown. The folder identifier 2620 is the information that indicates a relationship with the hot folder. The sending order information 2600 is a group of parameters that is specified by the user interface 2200 shown in FIG. 22.

There are provided, in correspondence with each of the check boxes 2201, 2202, 2207, and 2208 (from FIG. 22), a flag 2601 for plural files at the same time, a sending order specification flag 2602, a folder permission flag 2603, and a folder priority flag 2604. When the check box is checked, a corresponding flag is set. An output flag 2605 indicates that the hot folder is in the sendable state. If the output flag 2605 is on, the hot folder is in a state where the files can be output.

In a user-specified order information portion 2606, user-specified order information that indicates the sending order of the print jobs specified by the user interface shown in FIG. 22 is stored. For example, if an item serving as the sort key is specified from among the attributes of the hot folder, the information indicating the sort key is stored in the user-specified order information portion 2606. If the sending in accordance with the order specified by the user is selected, the information indicating the same content and the information indicating the order of sending allocated for each file are stored in the user-specified order information portion 2606.

The attribute information 2610 stores therein the print setting information related to the hot folder. This is similar to the case of the print setting information that can be set by the printer driver. For example, the attribute information 2610 includes items such as a printing method 2611 and a layout 2612. In addition, staple information 2613 (the information indicating presence or absence and a position of the staple) and folding information 2614 (the information indicating the preparation or absence and a method of folding), as the setting information for a finisher, are included in the attribute information 2610. In addition, if the defined job ticket is separately related to the attribute information 2610, a job ticket ID 2615 that is the identifier of the job ticket is included in the attribute information 2610.

FIG. 23 shows an exemplary procedure of processing executed by the hot folder program in accordance with the setting operation performed by the operator with the user interface shown in FIG. 21 (2100) and FIG. 22 (2200). First, the hot folder is opened (step S2300). In this procedure, next, the processing displays the user interface shown in FIG. 21 and waits for an input (step S2301). When the input is performed, the processing determines the content of the input. In determining the content of the input, it is then determined whether a sending order tag is selected is determined (step S2302). If the sending order tag is not selected, the processing is performed in accordance with the operation and/or content of the input (step 2317). If the sending order tag is selected, the processing displays a sending order user interface as shown in FIG. 22 and waits for an input (step S2303).

In the screen shown 2200 in FIG. 22, there is a region in which switching between display/non-display can be performed in accordance with the setting. In this regard, in step S2303, the screen in accordance with the setting is displayed. For example, if the "Specify Sending Order of Plural Files" check box 2202 is not checked, a "Specify Sending Order" column 2203 is not displayed. When there is an input, the processing determines which of the check boxes 2201, 2202, 2207, and 2208 is checked by the input (or cancelled by the input) (step S2304). If any one of the check boxes 2201, 2202, 2207, and 2208 is checked by the input (or cancelled by the input), a corresponding flag is set (in the case of the cancellation of the check, the flag is reset) (step S2305).

If no check is input in the check box from S2304, the processing shifts to step S2306. In step S2306, the user interface corresponding to the flag is displayed again. If the input is not the input for the operation of the check box, the processing determines whether the input is the operation of the "Specify Sending Order" column 2203 (step S2306).

Note that if the "Specify Sending Order of Plural Files" check box 2202 is not checked, the "Specify Sending Order" column 2203 is not displayed. Accordingly, the operator cannot perform an operation with the column. Therefore, it is not necessary to check the sending order specification flag. This applies to the other columns. That is, if a setting that is a prerequisite condition of setting a specific item needs to be performed, and if the prerequisite condition is not satisfied, the operator cannot perform the setting with the user interface. Thus, the prerequisite condition is not checked. Here, if the "Specify Sending Order" column 2203 is operated, sort key information that indicates the specified sort key (that is, a specified item of the attribute) is stored in the user-specified order information portion 2606 (step S2309).

If the specified order is "Send in Order Specified by User" (Yes in step S2308), it is necessary to order each of the files. Accordingly, an initial value ordered in an appropriate order is allocated to each file, and then the order information is stored in the user-specified order information portion 2606 (step S2309). Then, the document data (file) that is not yet sent is sorted in a specified order. The sorted document data is listed. The produced list is displayed in the file list column 2204 and is then stored. The produced list may be stored in the user-specified order information portion 2606 or may be stored in another region.

If it is determined that the sending order specification is not input in step S2306, it is determined whether a user-specified order specification (namely, an ordering made by operating the file list) is input (step S2311). If it is determined that the user-specified order specification is input, the specified order information is stored in the user-specified order information portion 2606 (step S2312). If it is determined that that the user-specified order specification is not input, it is determined whether an operation of the "Suspend Sending" button 2205 is input (step S2313).

If it is determined that the operation of the "Suspend Sending" button 2205 is input, the sending of the print job is suspended. In this regard, if there is any print job currently being sent, the sending of the print job is the suspended at the time of completion of the sending of the currently-sent print job, and if there is no print job currently being sent, the sending of the print job is immediately suspended. Then, the output flag 2605 is reset (step S2314) After that, the processing shifts to step S2303.

Next, it is determined whether the "Resume Sending" button 2206 is pressed (step S2315). If it is determined that the "Resume Sending" button 2206 is pressed, processing shown in FIG. 24 is executed (step S2316). Then, the processing shifts to step S2303. If it is determined that the input is performed related to an operation other than pressing of the "Resume Sending" button 2206, processing is performed in accordance with the input. If at S2315, if the resume of sending input does not occur (i.e., "No" or cancelled), the hot folder is then closed at step S2318. FIG. 23 shows a state where the hot folder user interface 2100, 2200 (FIGS. 21 and 22) is closed, supposing that the input other than the pressing of the "Resume Sending" button 2206 is limited to the pressing of the "Cancel" button.

FIG. 24 is a view showing exemplary processing of step S2316 in detail. First, the output flag 2605 is set (step S2400). Then, it is determined what sort key is specified (step S2401), and document data to be processed is selected in accordance with the sort key. In this embodiment, the sort key is either the file name, file date, or a key specified by the user. If it is determined that the sort key is the file name, the document data within the selected hot folder is ordered in an order of the file name, and document data with a smallest order number (namely, the document data at a top) among the document data that is not sent yet is selected as the document data to be processed next (step S2402).

If it is determined that the sort key is the file date, the document data within the selected hot folder is ordered in an order of the file date, and document data with a smallest order number (namely, the document data at a top) among the document data that is not sent yet is selected as the document data to be processed next (step S2403. In order to perform the ordering of the document data, the list produced in step S2310 may be referred to. In addition, if it is determined that the sort key is the key specified by the user, document data at a top among the document data that is not sent yet is selected (step S2404). Then, based on the document data selected in either of steps S2402 through 2404, a print job is produced. The produced print job is then sent to the image forming apparatus (step S2405).

At this time, based on attribute information related to the selected hot folder, a job ticket is produced. The produced job ticket is also sent to the image forming apparatus. The job ticket is in a format defined by JDF, for example. In the job ticket, each item of the print setting information is described by using a corresponding tag. Note that there are several methods for issuing the print job with the hot folder. For example, first, there is a method in which the document file is sent to the image forming apparatus together with the above-mentioned job ticket. In this case, it is necessary for the image forming apparatus itself to interpret the document data that is the application data to convert the document data into the data of a printable format. Also, it if also necessary for the image forming apparatus to interpret the job ticket.

Second, there is a method in which the document data within the hot folder is converted into a specific format and the converted document data is sent to the image forming apparatus together with the job ticket. For the specific format for the conversion, PDF, for example, is used. The image forming apparatus interprets and executes PDF, performs a layout operation, post-processing, and the like in accordance with the job ticket, and forms an image.

Third, there is a method in which PDL is used. In this method, based on the document data within the hot folder and the attribute information, the hot folder program produces print data of the PDL format that the image forming apparatus to be used supports, for itself or by using the printer driver. A print job is produced based on the produced print data, and then the produced print job is sent to the image forming apparatus. The image forming apparatus interprets and executes PDL and forms an image. In this method, the print setting information is converted into data of the PDL format and is included in the print data. Therefore, the job ticket is not necessary. Thus, various kinds of methods can be employed as long as the method can be processed by the image forming apparatus.

When the sending ends, the sent document data is marked with a mark indicating that the document data has been sent (step S2406). Then, it is determined whether there is document data that is not sent yet in the hot folder (step S2407). If it is determined that there is document data that is not sent yet in the hot folder, the processing shifts to step S2401. If it is determined that there is no document data that is not sent yet in the hot folder, the processing ends.

FIG. 25 shows an exemplary procedure of processing performed in a case where the hot folder program monitors the hot folders and document data is put into one of the monitored hot folders (hereinafter referred to as a target hot folder). First, it is determined whether what is desired to be put into the hot folder is a folder or not (step S2501). If it is determined that what is desired to be put into the hot folder is a folder, it is determined whether a folder permission flag is on or off (step S2502). Here, if it is determined that the folder permission flag is off, the processing determines that the operation performed is not permitted by the user, and then displays a message indicating "Putting in the document or the folder not permitted" (step S2510). Then the process ends. In this case, the operation of putting in the document or the folder is ignored. Thus, neither a state of the folder that is desired to be put in nor a state of the hot folder does not change.

If it is determined in steps S2501 and S2502 that what is desired to be put into the hot folder is not a folder but a file (namely, document data) or that putting a folder into the hot folder is permitted by the user, the processing proceeds to step S2503. In step S2503, it is determined whether a plurality of files is to be put into the target hot folder by the operation of putting in the folder or the file. If it is determined that the folder is put into the hot folder, then, it is determined whether a plurality of files are to be put into the hot folder, including the document data in the folder to be put in. If it is determined that a plurality of files is to be put into the hot folder, it is determined whether the flag 2601 for plural files at the same time is on or off (step S2504). If it is determined that the flag 2601 for plural files at the same time is off, the processing shifts to step S2510.

In step S2505, it is determined whether the output flag 2605 is on or off. If it is determined that the output flag 2605 is off, the target hot folder is in the suspension state. In this regard, the document data (or the folder, in some cases) that is put in is processed as necessary, and then the processed document data is stored as the document data in the hot folder (step S2506). The processing operated in accordance with the necessity here includes, if the operation is to move the document data, for example, processing to erase the document data of a moving source.

Next, the document data that is put into the hot folder is ordered in accordance with the specification by the user (in other words, in accordance with the specification based on the user-specified order information 2606), and the user-specified order information 2606 is updated (step S2507). Then the process ends. On the other hand, if it is determined in step S2505 that the output flag 2605 is on, it is determined whether document data that is not sent yet or document data that is currently being sent is present in the target hot folder (step S2508).

If it is determined that document data that is not sent yet or document data that is currently being sent is present in the target hot folder, the unsent document data or the currently-sent document data is not permitted to be put into the hot folder. Then, in step S2510, a message "Putting in the document or the folder not permitted" is displayed and the process ends. On the other hand, if it is determined that neither document data that is not sent yet nor document data that is currently being sent is present in the target hot folder, the document data that has been put into the hot folder is stored as the document in the hot folder (step S2509). Then, the processing shifts to step S2405 in FIG. 24 to output the stored document data (in other words, send the print job to the image forming apparatus).

As described above, the hot folder can send the document data that is put into the hot folder to the image forming apparatus in accordance with the specified sending order.

Alternative Variant of the First Embodiment

In some cases, the "Suspend Sending" button 2205 and the "Resume Sending" button 2206 shown in FIG. 22 are combined to be implemented on a user interface (UI) as a single button. In this case, when the combined button is pressed once, the sending of the print job is suspended, and when the combined button is pressed again, the print job is resumed. Accordingly, it is necessary in this case to allow the UI to be a UI by which the operator or the user can discriminate on the UI between the suspension of the print job and the resume of the print job.

In addition, there may be an implementation in which the sending is not started until a sending instruction is issued and the sending is started upon pressing of the "Resume Sending" button 2206 by the user after a plurality of files is completely put into the hot folder by the user. In this case, upon start of the sending, by prohibiting a putting of the files into the hot folder until the sending of all the files desired to be put in is completed, and also by prohibiting a new sending of the files desired to be put into the hot folder after the sending of all the desired files is completed (in other words, in this state, the sending of the files is suspended), the sending of the files in a wrong order can be prevented.

Otherwise, there may be an implementation in which the sending of the files is prohibited unless there is an instruction for sending the files, and a timer starts when the files are put into the hot folder. If a predetermined period of time lapses without a new putting in of the files, it is determined that all of the files desired to be put into the hot folder have been completely put in. Further, a message "Are all the files completely put in the hot folder? Start sending?" is displayed, and if the user or the operator presses a "Yes" or an "OK" button in response to this message, an instruction for start of sending is accepted.

In this case, it is preferable that the user can perform a setting as to at which timing the message is displayed. In any cases, it is necessary that the user can explicitly instruct a switching from the suspension state to the sendable state of the hot folder. The switching from the sendable state to the suspension state may be performed in accordance with an instruction issued by the user. Alternatively, the switching from the sendable state to the suspension state may be performed when the hot folder program has detected occurrence of a specific event due to causes other than an instruction from the user.

Second Exemplary Embodiment

Now, a second exemplary method for instructing the order of sending the job is explained below. In a second embodiment of the present invention, in putting a plurality of files to be printed into the hot folder, a specific kind of description file in which an order of sending to the image forming apparatus described is put into the hot folder together with the print file. For the description files, for example, there are JDF, which is recently and widely known, and a script file unique to each manufacturer of the image forming apparatus.

For a most simple method, there is a method in which a file name is described in a text format in accordance with the order of sending to the image forming apparatus, with respect to one file in one row. To put it more specifically, an example of this method is described below. Here, the file name is parenthesized by double quotation marks " ".

```
<Order description file>
<Order of sending>
"Document P"
"Document Q"
"Document R"
"Document S"
<End>.
```

The file name of a sending order description file is not restricted to a specific name type. However, by restricting the file name of the sending order description file to a specific defined type of name, an implementation of a method for allowing the hot folder program to recognize a file as the description file can be simplified. Here, the hot folder program performs a search as to whether the sending order description file exists within the hot folder.

If the sending order description file is found as a result of the search by the hot folder program, then the hot folder program interprets a content of the description file. For example, in the above-mentioned example, first, the hot folder program extracts a file name from the first row (in the above-mentioned example, "Document P"). Then, the hot folder program detects a file corresponding to the extracted file name.

When the file corresponding to the extracted file name is found by the hot folder program, the hot folder program sends the found file to the image forming apparatus. The processing repeats this procedure until all of the files specified by the description file are sent to the image forming apparatus.

Alternatively, in a case where the sending order description file describes:

```
<Order description file>
<Order of sending>
By date
<End>,
``` the hot folder program rearranges the files existing within the hot folder in the order of file date (a function for rearranging the files in the order of the file date is provided by an OS with which the hot folder program can operate). Then, the files are sent to the image forming apparatus in the rearranged file order. The processing repeats this procedure until all of the files desired to be sent to the image forming apparatus are completely sent.

As is explained in the first embodiment, the sending order is set as one part of attribute of the hot folder. If the setting of the sending order that is one part of attribute of the hot folder and the settings according to the second embodiment contradict each other, it is necessary to prioritize either one of the settings. The priority may be applied depending on the content of the settings. In this regard, if a sending order description file exists, the user can utilize an advantage such that a change in the settings can be simply applied by performing an operation for overwriting the set value set by the operation performed through the screen shown in FIG. 22.

Third Exemplary Embodiment

In some cases, a plurality of files are classified and arranged in accordance with a certain attribute while being stored in a single folder. In putting the plurality of files stored in the single folder into the hot folder, the user can utilize an advantage if the single folder storing the files can be put into the hot folder as it is. In a third embodiment, an explanation is made as to an operation performed in a case where one or more folders and one or more files are put into the hot folder in a mixed manner. The hot folder, when it is in the sendable state, rearranges the document data stored therein in the order of sending of document data.

If the "Permit Sending of Folder" check box 2207 is checked and set in the screen shown in FIG. 22, the folder containing the files desired to be sent can be put into the hot folder. In this case, if the folder exists in the hot folder, a retrieval for a folder (or the document data or the document file, and the like) is performed with respect to the folder existing in the hot folder. Then, if the folder further includes therein another folder that is a subfolder, the retrieval for a folder (or the document data or the document file, and the like) is performed with respect to the subfolder in the folder existing in the hot folder. Then, if there exists the document data (document files) in the folder or in the subfolder, the document data (document files) is rearranged in the order of sending.

For a method for rearranging the document data (document files), there are methods as described below. Namely, there is a method in which, regardless of which folder includes which file, all of the files are rearranged in accordance with a specified order. Also, there is a method in which first the folders are rearranged, and after that, the files in each folder are rearranged file by file. In this regard, it is preferable that the user can perform a specification as to which method is to be used for the rearrangement.

For example, if the check box 2208 shown in FIG. 22 is checked and set, the rearrangement of the folders is prioritized to be firstly performed, and after that, the files existing within each folder are rearranged in a desired order. On the other hand, if the check box 2208 shown in FIG. 22 is not checked and set, all of the files are rearranged in the specified order, regardless of which file is included in which folder. Thus, all of the files existing within the hot folder are rearranged in accordance with the specification as to the method of rearranging the order of folders and the files, and after that, the rearranged folders and files are sent to the image forming apparatus.

In addition, by producing the above-mentioned sending order description file for each folder and by including the produced sending order description file in each corresponding folder, an arbitrary order of rearrangement can be independently and separately specified for each folder. For example, suppose there are plural folders, such as a folder X, a folder Y, and a folder Z. An example of the method is described below in which the sending order to be specified for the folders X, Y, and Z is collectively specified by a single sending order description file.

```
<Order description file>
<Order of sending>
Folder X
By date
Folder Y
"Document P"
"Document Q"
"Document R"
"Document S"
Folder Z
By date
<End>.
```

In this example, first, files within the folder X are sent in the order of file date. Then, the documents P, Q, R, and S that describe the files within the folder Y are sent in this order. Finally, the files within the folder Z are sent in the order of file date.

As shown in this example, in this embodiment, the sending of the files can be performed while specifying an arbitrary sending order for each folder.

Fourth Exemplary Embodiment

When there is a plurality of instructions for the print job issued by a plurality of users, and also, when there is a plurality of transmissions from a plurality of hot folders, a boundary of the print jobs cannot easily be recognized. In this regard, especially when a large number of printouts are outputted onto a stacker installed to a high-speed image forming apparatus that is capable of stacking such large number of printouts, the above-mentioned difficulty in recognizing the boundary of the print jobs becomes more serious.

In order to countermeasure this difficulty, in a fourth embodiment of the present invention, in collectively printing out the data (documents) by using the hot folder function, a top cover (a banner page or a cover page) is attached to the printouts. In addition, if the above-mentioned description file is used, the method according to this embodiment can readily be implemented if the printing is performed in accordance with the description expressed in the description file.

Fifth Exemplary Embodiment

For the hot folder, there is one type that is so-called a server type, and there is another type that is so-called a client type. The server type hot folder is implemented in the image forming apparatus, and on the other hand, the client type hot folder is implemented in the client computer (personal computer of the user). The hot folder as described in the first embodiment of the present invention is the server type hot folder.

In the case of the server type hot folder, data (files) sent from a plurality of users is put into a single folder. Therefore, it is necessary to control the hot folder by using an exclusive control function. For example, when one user starts to put the files into a hot folder by pressing the "Suspend Sending" button 2205, the hot folder program necessarily locks the hot folder in relation to other users.

As a result of the locking, when another user tries to press the "Suspend Sending" button 2205, an warning message is issued to notify the user trying to press the "Suspend Sending" button 2205 that pressing of the "Suspend Sending" button 2205 is currently being prohibited and the exclusive control is applied against the users other than the user who has put the files into the hot folder.

In this embodiment, by implementing the method in the apparatus so that a subsequent user is allowed to perform the desired operation upon completion of the putting of the files into the hot folder and the sending of the files by the first user, the exclusive control can be implemented. Thus, in the case of the server type hot folder, into which files sent from a plurality of users can be put into a single hot folder, it is necessary to implement the exclusive control. In this case, the document data cannot necessarily be put into the locked hot folder by a user other than the user currently using and operating the hot folder (hereinafter referred to as an "operating user"). That is, document data sent from the users other than the operating user cannot possibly be put into the hot folder.

In order to implement the exclusive control, there may be provided a user name of the operating user as an attribute of the hot folder. Then, when an event occurs due to an operation by a user in relation to the hot folder, a comparison between the user name of the user who has caused the event and the user name of a user who is operating the hot folder. If, as a result of the comparison, it is determined that the user names do not match each other, the processing shifts to step S2510 in FIG. 25.

The user name of the user who caused the event can be obtained from the user name of a source of sending of the document data, for example. On the other hand, in the case of the client type hot folder, files are sent form a plurality of hot folders to a single image forming apparatus. Thus, the print files sent from a plurality of hot folders are liable to be received in a chaotic manner.

In this case also, in order to prevent this from occurring, it is necessary to carry out exclusive control independently and separately for each hot folder. For example, the exclusive control may be carried out in such a manner that when the sending of print files from one specific folder is started, the sending of files from other hot folders is prohibited so as not to accept the files that are sent after the first sending of files are started. In this case, in order to prevent the sending of print jobs from being performed while the sending of print jobs is prohibited, it is preferable to add a procedure for reservation of the sending of the print job before the procedure of sending the print job.

Alternatively, it is also preferable in this case to provide a spooling function to the image forming apparatus. In the spooling function, the image forming apparatus temporarily receives files from hot folders other than the hot folder from which the files have been sent, so as to prevent a mixture of the print files currently standing by for the printing process with the print files that are already put into the hot folder currently being subjected to the printing process.

When the first printing process ends, the next printing process for the print files stored in the spooling portion is carried out. By providing a plurality of spooling portions to the image forming apparatus, the image forming apparatus can receive files without causing the other hot folders to stand by for sending the files to be processed.

Other Exemplary Embodiments, Features, and Aspects of the Present Invention

With respect to the embodiments of the present invention, "document data" refers to data that is an object of printing, and includes the image data photographed by a digital camera, for example, as well as the document data produced by a word processing program.

The document data is stored in a format of a file in the computer, and accordingly, the document data is sometimes called a document data file or a document file. Of course, the document file may be electronic data that is not stored in the file format, and may include the data allocated in a memory as a data block by being directly extracted from a database that is not managed by a file system. Such kinds of data is collectively referred to as the "data to be outputted". Also, such kinds of data refers to the data to be printed. In addition, such kinds of data is referred to as an electronic document, in order to discriminate the data from a printed document.

The functions shown in the drawings referred to in the embodiments of the present invention as described above may be executed by a host computer by using a program installed from a device external to the apparatus of the present invention. Note, in this case, that a constitution of the embodiments of the present invention is such that data for displaying an operation screen equivalent to the operation screen including each operation screen as described in the above embodiments is installed from an external device, and thus each of various kinds of user interface screens can be provided to a display unit of the host computer.

The present invention can be applied to a case where a cluster of information that includes a program is supplied to an output apparatus by means of a storage medium such as a CD-ROM, a flash memory, a floppy (registered trademark) disk, or from an external storage medium via the network. As described above, in the embodiments of the present invention, a storage medium that records and stores therein program code of software that implements the functions of the above-mentioned embodiments is supplied to the system or the apparatus.

In addition, an aspect of the present invention can of course be achieved by causing a computer (a CPU or an MPU) of the system or the apparatus to read and execute the program code stored in the storage medium. In this case, the program code that is read from the storage medium itself implements the above-mentioned novel functions of the present invention, and accordingly, the storage medium that stores the program code constitutes the present invention. Therefore, a form of the program is not restricted to a form such as an object code, a program executed by an interpreter, script data supplied to an operating system (OS), as long as the program is provided with a function of a program.

The storage medium for supplying such a program includes, for example, a flexible disk, a hard disk, an optical disk, a magneto-optical disk (MO), a CD-ROM, a CD-R, a CD-RW, a magnetic tape, a nonvolatile memory card, a ROM, a DVD, and the like. In this case, the program code that is read from the storage medium itself implements the functions of the above-mentioned embodiments of the present invention, and accordingly, the storage medium that stores the program code constitutes the present invention.

In addition, for a method for supplying the program, a method may be employed such that a connection to a web site on the Internet is established by using a web browser of the client computer. Further, the computer program of the present invention may be downloaded from the web site. In addition, otherwise, the user may download a compressed file having an automatic installation function into a recording medium such as the hard disk installed to the computer of the user.

In addition, the method for supplying the program of the present invention can be implemented by dividing the program code that constitutes the program of the present invention into a plurality of files and causing each file to be downloaded from different web sites on the Internet.

Further, the functions according to the embodiments described above are implemented not only by executing the program code read by the computer, but also implemented by the processing in which an operating system (OS) or the like carries out a part of or the whole of the actual processing on the basis of the instruction given by the program code.

Further, in another aspect of the present invention, after the program code read from the storage medium is written in a function enhancing board inserted in the computer or a memory that is provided in a function enhancing unit connected to the computer, the CPU and the like provided in the function enhancing board or the function enhancing unit carries out a part of or the whole of the processing to implement the function of the embodiment as described above.

In addition, the present invention can be applied to a system constituted by a plurality of units or devices or to an apparatus constituted by a single unit or device. Further, the present invention can be applied to a case where an aspect of the present invention is achieved by supplying the program to the system or the apparatus. In this case, the system or the apparatus can utilize an effect of the present invention by causing the storage medium storing the program described by the software for achieving the present invention to be read out to the system or the apparatus.

In addition, according to the embodiments of the present invention, a plurality of documents that are put into the hot folder can be outputted in the order specified by the user. Also, the order of outputting the documents can be specified by using the attribute of the document as the sort key. Therefore, it is not necessary to perform the specification of the order for each of the documents, and thus the operation can be simplified. Further, according to the embodiments of the present invention, the date or the name of the document can be specified as the attribute of the document, and thus the documents can be easily printed in the order of the date or the order of the name of the document. In addition, the order can be independently and separately specified for each of the documents. Further, the order can be specified in accordance with the data describing the order that is stored in, relation to the hot folder. Further still, the documents can be outputted in a format corresponding to each hot folder by attaching the hot folder with the print setting information related to the hot folder.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-171663 filed Jun. 10, 2005, which is hereby incorporated by reference herein in its entirety.

What is claimed is:

1. A non-transitory computer readable medium encoded with a computer program for causing a computer to function as:
   a state switching unit configured to switch a storage area between an outputting state and a non-outputting state, based on a user's operation via a user interface;
   a detection unit configured to detect input of data into the storage area;
   a send unit configured to send, when the detection unit detects input of data into the storage area which is in the outputting state, a print job produced based on the data which is input to the storage area to an image forming apparatus;
   a storage unit configured to store, when the detection unit detects input of data into the storage area which is in the non-outputting state, the data which is input into the storage area; and
   a specification unit configured to specify an order of outputting a plurality of data which is stored in the storage area when the storage area is in the non-outputting state;
   wherein when the storage area is switched from the non-outputting state to the outputting state based on the user's operation via the user interface, the send unit sends the print job produced based on the plurality of data stored in the storage area to the image forming apparatus in accordance with the order specified by the specification unit.

2. The computer readable medium according to claim 1, wherein the specification unit specifies an order determined with an attribute of the data to be output as a key, and
   wherein, in a case where the order determined with the attribute of the data to be output as a key is specified by the specification unit, the send unit sends the print job to the image forming apparatus in accordance with the specified order determined with the attribute as a key.

3. The computer readable medium according to claim 2, wherein the attribute that can be specified by the specification unit includes a date and a name of the data to be output.

4. The computer readable medium according to claim 1, wherein the specification unit specifies an order in accordance with an order of each data to be output that is input by a user,
   wherein, in a case where a specification is performed by the specification unit so that the data to be output is ordered in accordance with the order of each data to be output that is input by the user, the send unit sends the print job to the image forming apparatus in accordance with the specified order of each data to be output.

5. The computer readable medium according to claim 1, wherein the specification unit specifies the order in accordance with data describing an order that is stored in association with the storage unit.

6. The computer readable medium according to claim 1, wherein the state switching unit switches the storage area between the outputting state and the non-outputting state in accordance with an input by a user.

7. The computer readable medium according to claim 1, wherein the state switching unit switches the storage area from the non-outputting state to the outputting state in accordance with an input by a user, and switches the storage area from the outputting state to the non-outputting state in accordance with an occurrence of an event other than the input by the user.

8. The computer readable medium according to claim 1, wherein the computer further functions as the storage unit configured to store print setting information associated with the storage area,
   wherein the send unit produces a print job by attaching the print setting information to the data to be output, and outputs the produced print job.

9. The computer readable medium according to claim 1, wherein the computer further functions as the storage unit configured to store print setting information associated with the storage area
   wherein the send unit produces a print job by converting a content of the data to be outputted into print data that reflects the print setting information, and outputs the produced print job.

10. The computer readable medium according to claim 1, wherein, in a case where the data to be output that is stored in the storage area is grouped by a folder, the send unit sends the print job to the image forming apparatus in accordance with an order determined based on an inter-group order and an intra-group order of the data to be output.

11. An image processing apparatus comprising:
   a state switching unit configured to switch a storage area between an outputting state and a non-outputting state based on a user's operation via a user interface;
   a detection unit configured to detect input of data into the storage area;

a send unit configured to send, when the detection unit detects input of data into the storage area which is in the outputting state, a print job produced based on the data which is input to the storage area to an image forming apparatus;

a storage unit configured to store, when the detection unit detects input of data into the storage area which is in the non-outputting state, the data which is input into the storage area;

a specification unit configured to specify an order of outputting a plurality of data which is stored in the storage area when the storage area is in the non-outputting state;

wherein when the storage area is switched from the non-outputting state to the outputting state based on the user's operation via the user interface, the send unit sends the print job produced based on the plurality of data stored in the storage area to the image forming apparatus in accordance with the order specified by the specification unit.

12. The image processing apparatus according to claim 11, wherein the specification unit specifies an order determined with an attribute of the data to be output as a key, and wherein, in a case where the order determined with the attribute of the data to be output as a key, the send unit sends the print job to the image forming apparatus in accordance with the specified order determined with the attribute as a key.

13. The image processing apparatus according to claim 12, wherein the attribute that can be specified by the specification unit includes a date and a name of the data to be output.

14. The image processing apparatus according to claim 11, wherein the specification unit specifies an order in accordance with an order of each data to be output that is input by a user, wherein, in a case where a specification is performed by the specification unit so that the data to be output is ordered in accordance with the order of each data to be output that is input by the user, the send unit sends the print job to the image forming apparatus in accordance with the specified order of each data to be output.

15. The image processing apparatus according to claim 11, wherein the specification unit specifies the order in accordance with data describing an order that is stored in association with the storage unit.

16. The image processing apparatus according to claim 11, wherein the state switching unit switches the storage area between the outputting state and the non-outputting state in accordance with an input by a user.

17. The image processing apparatus according to claim 11, wherein the state switching unit switches the storage area from the non-outputting state to the outputting state in accordance with an input by a user, and switches the storage area from the outputting state to the non-outputting state in accordance with an occurrence of an event other than the input by the user.

18. The image processing apparatus according to claim 11, further comprising the storage unit configured to store print setting information associated with the storage area, wherein the send unit produces a print job by attaching the print setting information to the data to be output, and outputs the produced print job.

19. The image processing apparatus according to claim 11, further comprising the storage unit configured to store print setting information associated with the storage area, wherein the send unit produces a print job by converting a content of the data to be output into print data that reflects the print setting information, and outputs the produced print job.

20. The image processing apparatus according to claim 11, wherein, in a case where the data to be output that is stored in the storage area is grouped by a folder, the send unit sends the print job to the image forming apparatus in accordance with an order determined based on an inter-group order and an intra-group order of the data to be output.

21. A method for printing a document from an image processing apparatus, the method comprising:

via state switching unit, switching a storage area between an outputting state and a non-outputting state, based on a user's operation via a user interface;

via a detection unit, detecting input of data into the storage area;

via a sending unit, sending, when input of data into the storage area which is in the outputting state is detected by the detection unit, a print job produced based on the data which is input to the storage area to an image forming apparatus;

via a storage unit, when the detection unit detects input of data into the storage area which is in the non-outputting state, storing the data which is input into the storage area; and via a specification unit, specifying an order of outputting a plurality of data which is stored in the storage area when the storage area is in the non-outputting state;

wherein when the storage area is switched from the non-outputting state to the outputting state based on the user's operation via the user interface, the sending unit sends the print job produced based on the plurality of data stored in the storage area to the image forming apparatus in accordance with the order specified by the specification unit.

* * * * *